(12) United States Patent
Rodgers

(10) Patent No.: US 12,197,843 B2
(45) Date of Patent: Jan. 14, 2025

(54) AUTOMATIC LAYOUT OF ELEMENTS IN A PROCESS FLOW ON A 2-D CANVAS BASED ON REPRESENTATIONS OF FLOW LOGIC

(71) Applicant: Oracle International Corporation, Redwood Shores, CA (US)

(72) Inventor: Michael Patrick Rodgers, Lake Oswego, OR (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/216,010

(22) Filed: Mar. 29, 2021

(65) Prior Publication Data

US 2021/0303773 A1  Sep. 30, 2021

Related U.S. Application Data

(60) Provisional application No. 63/002,130, filed on Mar. 30, 2020.

(51) Int. Cl.
*G06F 40/14* (2020.01)
*G06F 40/103* (2020.01)

(52) U.S. Cl.
CPC ............ *G06F 40/14* (2020.01); *G06F 40/103* (2020.01)

(58) Field of Classification Search
CPC ...... G06F 40/14; G06F 40/103; G06F 40/143; G06F 8/34
USPC .................................................. 715/235, 243
See application file for complete search history.

(56) References Cited

U.S. PATENT DOCUMENTS

| 5,596,704 | A | 1/1997 | Geddes et al. | |
|---|---|---|---|---|
| 7,760,956 | B2 * | 7/2010 | Lin | G06V 20/40 382/254 |
| 7,810,024 | B1 * | 10/2010 | Goldman | G06F 40/143 715/234 |

(Continued)

FOREIGN PATENT DOCUMENTS

| CN | 103207730 | 3/2016 |
|---|---|---|
| CN | 110569027 | 12/2019 |

(Continued)

OTHER PUBLICATIONS

Tomáš Tušla; Layout of hierarchical flow charts; May 2017; Czech Technical University in Prague; pp. 1-46.*

(Continued)

*Primary Examiner* — Maikhanh Nguyen
(74) *Attorney, Agent, or Firm* — Kilpatrick Townsend & Stockton LLP

(57) ABSTRACT

Layouts for elements of a flowchart or flow diagram may use recursive algorithms that trace along each parent-child pathway to ensure that child elements always occur after parent elements in a horizontal spacing. Vertical spacing requirements may then be calculated for each element, along with a vertical space above a center line and a vertical space below a center line for each element. These vertical spacing requirements may then be used by a recursive algorithm to assign vertical positions to each of the elements. The vertical spacing may ensure that lanes created for each branch element are not crossed by later elements in the process flow, which ensures that connections between elements may be clearly distinguished from each other.

17 Claims, 19 Drawing Sheets

(56) References Cited

U.S. PATENT DOCUMENTS

| | | | | |
|---|---|---|---|---|
| 8,205,152 | B2* | 6/2012 | Ivarsoy | G06F 16/9577 715/240 |
| 8,489,986 | B2* | 7/2013 | Haug, III | G06T 11/206 715/244 |
| 8,542,234 | B2* | 9/2013 | Madden | G06T 11/206 345/440 |
| 8,717,383 | B2 | 5/2014 | Coldicott et al. | |
| 9,164,965 | B2* | 10/2015 | Molesky | G06F 40/103 |
| 9,324,168 | B2* | 4/2016 | Haug, III | G06T 11/206 |
| 9,367,201 | B2* | 6/2016 | Song | G06F 3/0482 |
| 10,360,200 | B1* | 7/2019 | Kirby | G06F 16/252 |
| 10,387,547 | B2* | 8/2019 | Simonyi | G06F 40/197 |
| 2003/0130977 | A1* | 7/2003 | Oommen | G06V 30/1988 707/E17.012 |
| 2005/0071364 | A1* | 3/2005 | Xie | G06F 16/9577 707/999.102 |
| 2005/0289526 | A1* | 12/2005 | Wang | G06F 8/10 717/132 |
| 2006/0136825 | A1* | 6/2006 | Cory | G06T 11/206 715/700 |
| 2006/0236224 | A1* | 10/2006 | Kuznetsov | G06F 40/154 715/235 |
| 2007/0143673 | A1* | 6/2007 | Tolle | G06Q 10/10 715/209 |
| 2007/0180408 | A1* | 8/2007 | Rusu | G06F 16/957 715/855 |
| 2008/0010589 | A1* | 1/2008 | Gibson | G06Q 10/10 715/246 |
| 2008/0120368 | A1* | 5/2008 | Gale | G06F 40/143 709/203 |
| 2008/0291203 | A1* | 11/2008 | Nachmanson | G06T 11/206 345/440 |
| 2009/0089660 | A1* | 4/2009 | Atkins | G06F 40/106 715/243 |
| 2009/0132566 | A1* | 5/2009 | Ochi | G06F 40/137 |
| 2011/0214050 | A1* | 9/2011 | Stambaugh | G06F 16/9537 715/234 |
| 2013/0124568 | A1* | 5/2013 | Wang | G06F 40/143 707/783 |
| 2013/0124981 | A1* | 5/2013 | Chao | G06F 40/103 715/243 |
| 2013/0278638 | A1* | 10/2013 | Yoshikawa | G06F 8/10 345/681 |
| 2014/0096058 | A1* | 4/2014 | Molesky | G06F 40/103 715/771 |
| 2016/0027197 | A1* | 1/2016 | Beckett | G06T 11/206 345/440 |
| 2016/0054894 | A1* | 2/2016 | Zhang | G06Q 10/105 715/811 |
| 2016/0132466 | A1* | 5/2016 | Zhang | G06Q 10/063 715/202 |
| 2016/0371168 | A1* | 12/2016 | Chatty | G06F 8/34 |
| 2018/0189243 | A1* | 7/2018 | Allyn | G06F 3/04845 |
| 2019/0196939 | A1* | 6/2019 | Lengauer | G06F 11/3006 |
| 2019/0332861 | A1* | 10/2019 | Biswas | G06F 40/154 |
| 2019/0385348 | A1* | 12/2019 | Lee | G06T 11/60 |

FOREIGN PATENT DOCUMENTS

| | | |
|---|---|---|
| CN | 106557457 | 1/2020 |
| KR | 20030018722 | 3/2003 |
| WO | 02097727 | 7/2004 |

OTHER PUBLICATIONS

Jason Brownlee; How to Implement the Decision Tree Algorithm From Scratch in Python; Dec. 11, 2019; machinelearningmastery.com/implement-decision-tree-algorithm-scratch-python; pp. 1-93.*

Rachel Lim; Algorithm for Drawing Trees; Apr. 20, 2014; Rachel Lim's Blog; rachel53461.wordpress.com/2014/04/20/algorithm-for-drawing-trees; pp. 1-21.*

"Calculate;" The Free Dictionary; Oct. 21, 2019; thefreedictionary.com/calculate; pp. 1-2.*

"Coordinate;" Free On-Line Dictionary of Computing; Jul. 9, 1997; pp. 1-2.*

"Automatic Diagram Layout", Available online at: https://www.visual-paradigm.com/support/documents/vpuserguide/1283/28/6047_automaticdia.html, Accessed from Internet on: Dec. 28, 2020, 23 pages.

"Code2flow", Available online at: https://code2flow.com/, Accessed from Internet on: Dec. 28, 2020, 2 pages.

"Code2flow—Product", Available online at: https://code2flow.com/product#features-section, Accessed from Internet on: Dec. 28, 2020, 11 pages.

"Smartdraw-Flowchart Maker", Available online at: https://www.smartdraw.com/flowchart/flowchart-maker.htm, Accessed from Internet on: Dec. 28, 2020, 18 pages.

* cited by examiner

AUTOMATIC LAYOUT OF ELEMENTS IN A PROCESS FLOW ON A 2-D CANVAS BASED ON REPRESENTATIONS OF FLOW LOGIC

CROSS-REFERENCES TO RELATED APPLICATIONS

This application is a nonprovisional of and claims the benefit of U.S. Provisional Patent Application No. 63/002,130 filed on Mar. 30, 2020, which is incorporated herein by reference in its entirety.

BACKGROUND

Process flows are a standard construct used across many different applications. A process flow may be represented as a flowchart, which is a decision process comprising a step-by-step set of instructions. For example, a computer program may be represented as a series of steps, including branches, decisions, iterations, loops, and so forth. For example, an orchestration is a set of processes that have been automated together to execute sequentially. Tools are available to graphically lay out process flows such that they can be viewed and/or manipulated through a user interface such that users can follow an execution flow from one process to the next. This type of representation is very useful for illustrating and explaining a process flow to other users, but only insofar as it is organized and readable.

SUMMARY

Layouts for elements of a flowchart or flow diagram may use recursive algorithms that trace along each parent-child pathway to ensure that child elements always occur after parent elements in a horizontal spacing. Vertical spacing requirements may then be calculated for each element, along with a vertical space above a center line and a vertical space below a center line for each element. These vertical spacing requirements may then be used by a recursive algorithm to assign vertical positions to each of the elements. The vertical spacing may ensure that lanes created for each branch element are not crossed by later elements in the process flow, which ensures that connections between elements may be clearly distinguished from each other.

A data structure may store nodes that are linked together in hierarchical relationships. The hierarchy may include single-parent, multi-parent, single-child, and/or multi-child relationships. The different nodes may include process nodes, branch nodes, join nodes, start nodes, end nodes, etc. Data structures such as XML documents, JSON files, relational databases, linked lists, vectors, and/or the like may be used to store the nodes in the hierarchy. These data structures may be accessed, and the nodes/relationships stored therein may be used as an input to generate a corresponding flowchart display.

Separate algorithms may be executed to determine (1) positions for each node in a first direction (e.g., a horizontal direction in which data flows), and (2) positions for each node in a second direction (e.g., a vertical direction indicating parallel processing or branches). For example, a recursive algorithm may be used to assign positions represented by indices in a horizontal direction. The recursive algorithm may traverse each child node through the data structure and increment the index at each recursive level. If a node is visited through multiple recursive branches, the node may use the highest index to ensure that child nodes follow corresponding parent nodes in the flowchart display.

The algorithm for assigning positions in the second direction (e.g., the vertical direction) may include two different operations. The first operation may calculate a vertical space used by each node in the display. Nodes with only a single child may use the vertical space calculated for the child node. Branch nodes with multiple children may use a combination of the vertical space calculated for each of the branches. This ensures that the vertical space for a parent node is at least as large as the total space required to display child nodes. This prevents intersections in the connections between nodes. Some embodiments may also calculate a vertical space above/below a centerline for each node, which may also be used to calculate the vertical space requirements for a parent node.

The second operation for assigning a vertical position may recursively traverse the hierarchy to identify branch nodes and their corresponding join nodes. Branches and joins can be aligned vertically such that both branches are divided by the horizontal line extending between the branch node and the join node. Positions for each parent node can then be assigned based on positions of the child nodes and their corresponding vertical space requirements.

Once the positions in both dimensions have been assigned, the indices for these positions may be translated into screen coordinates and used to generate a flowchart display. Each of the nodes in the hierarchy can be represented by graphical icons and connected by edges or lines representing parent-child relationships.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

BRIEF DESCRIPTION OF THE DRAWINGS

Figure 1:
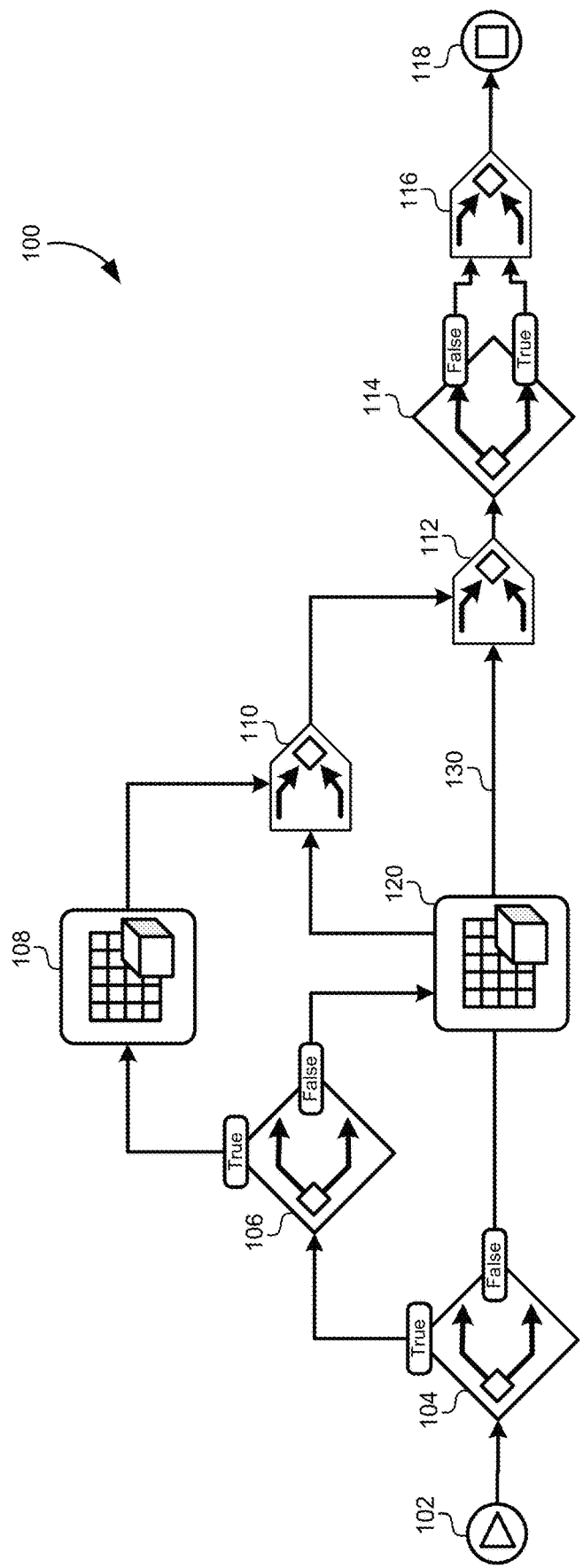

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 1 illustrates an example of a graphical representation of a hierarchy as a flowchart or flow diagram, according to some embodiments.

Figure 2:
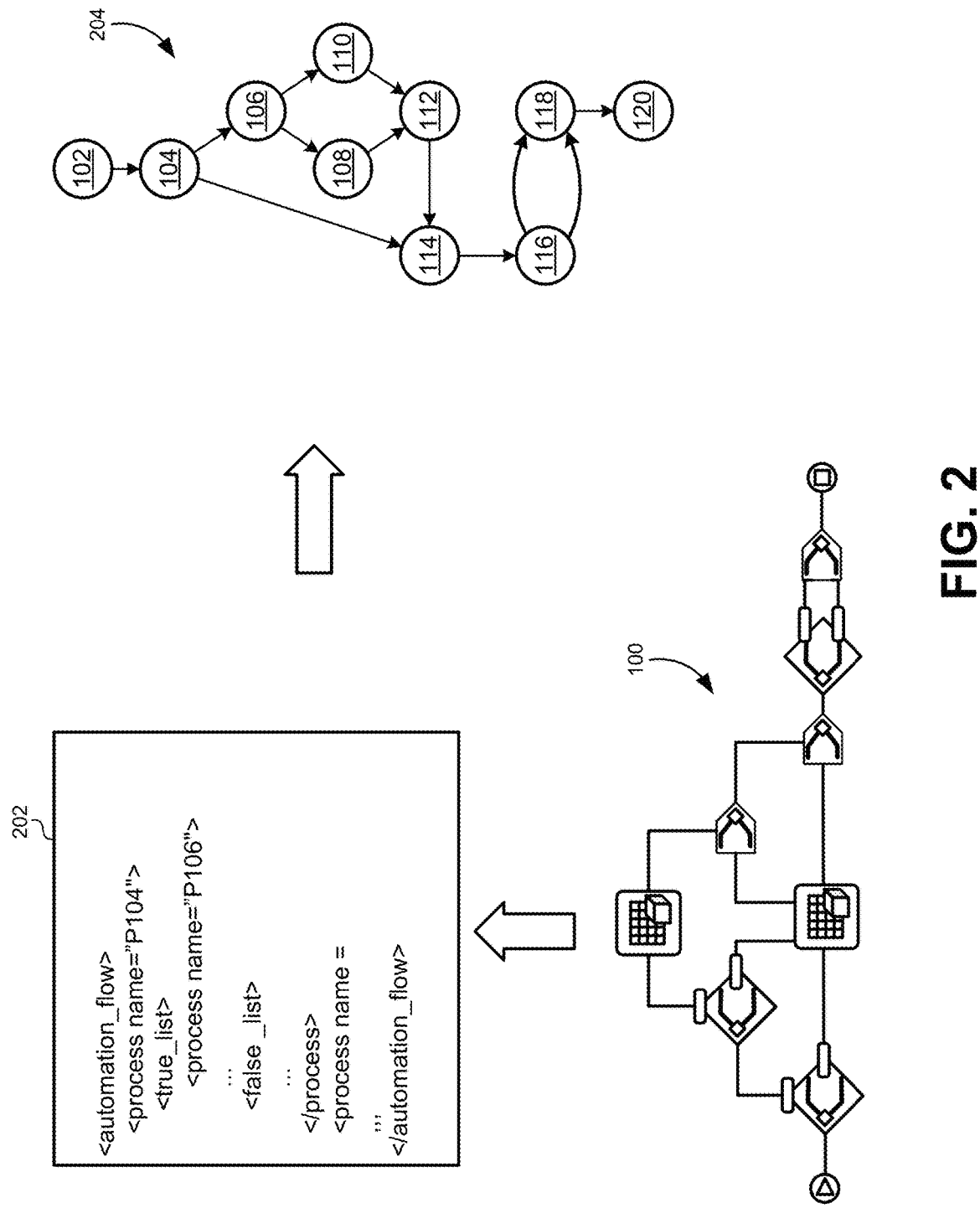

FIG. 2 illustrates how an existing flowchart may be translated into a hierarchy of a plurality of nodes, according to some embodiments.

Figure 3A:
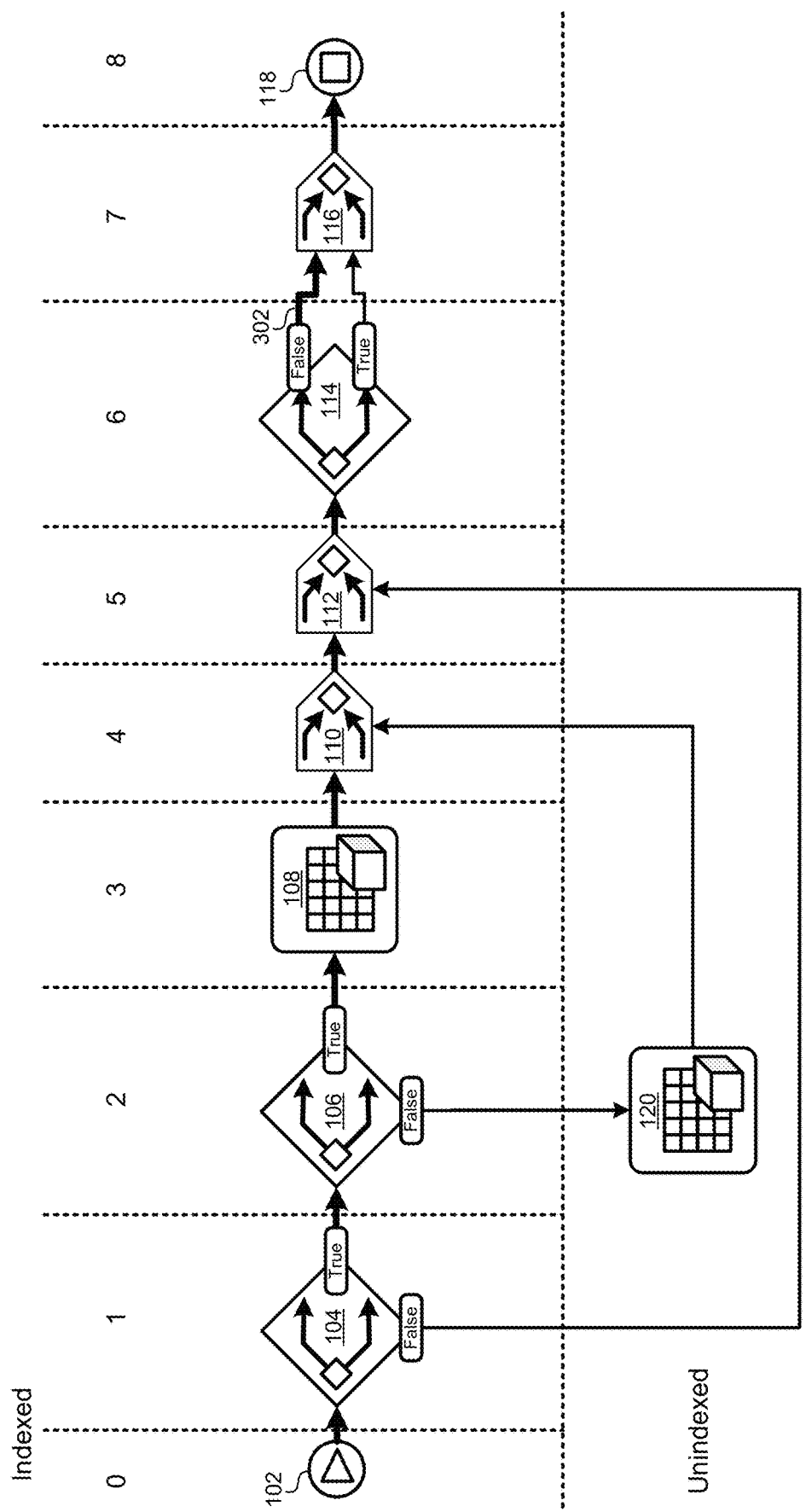

FIG. 3A illustrates how horizontal positions may be assigned to each node, according to some embodiments.

Figure 3B:
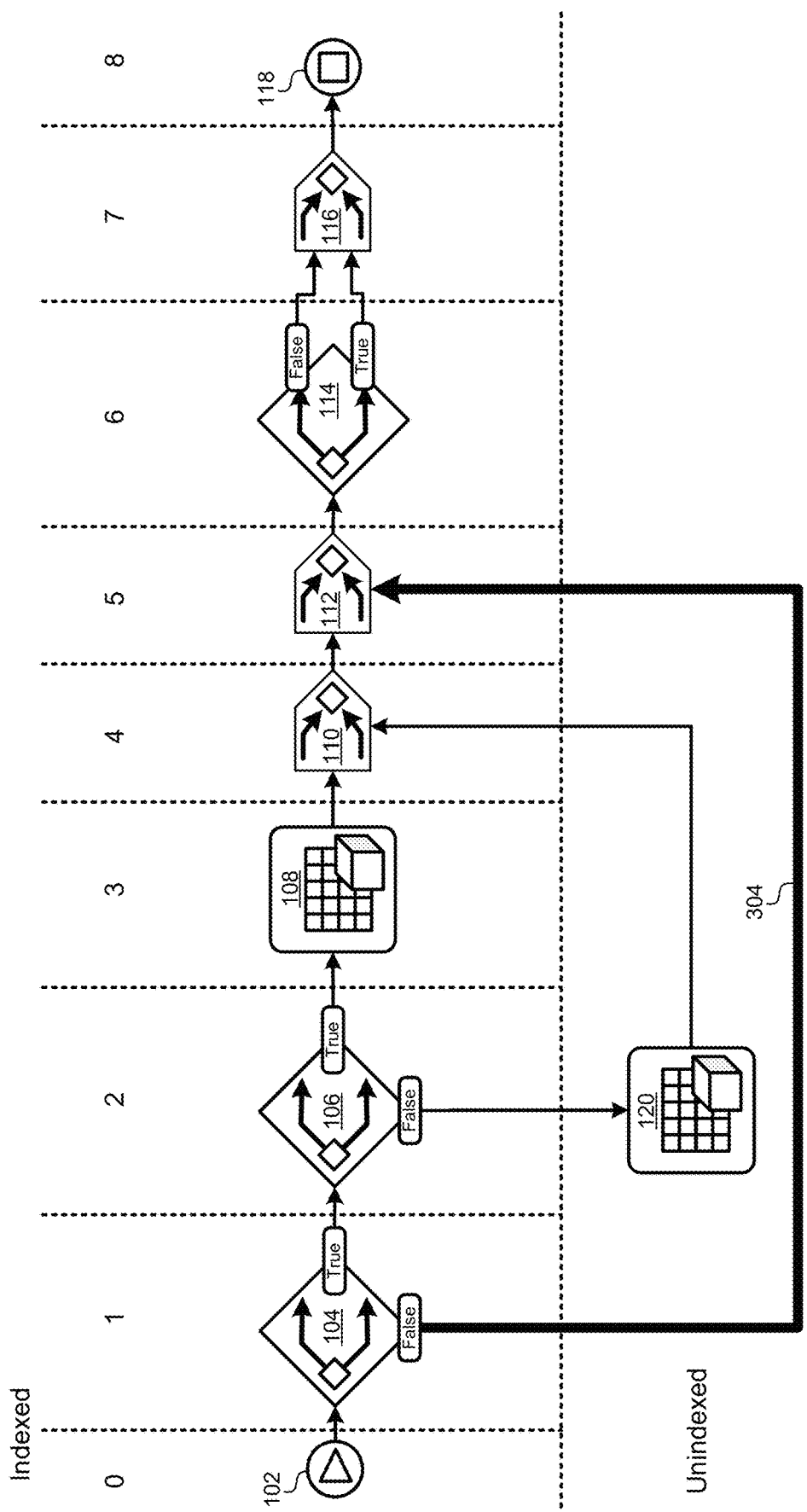

FIG. 3B illustrates how indexes may be reprocessed through different execution paths using a recursive algorithm, according to some embodiments.

Figure 3C:
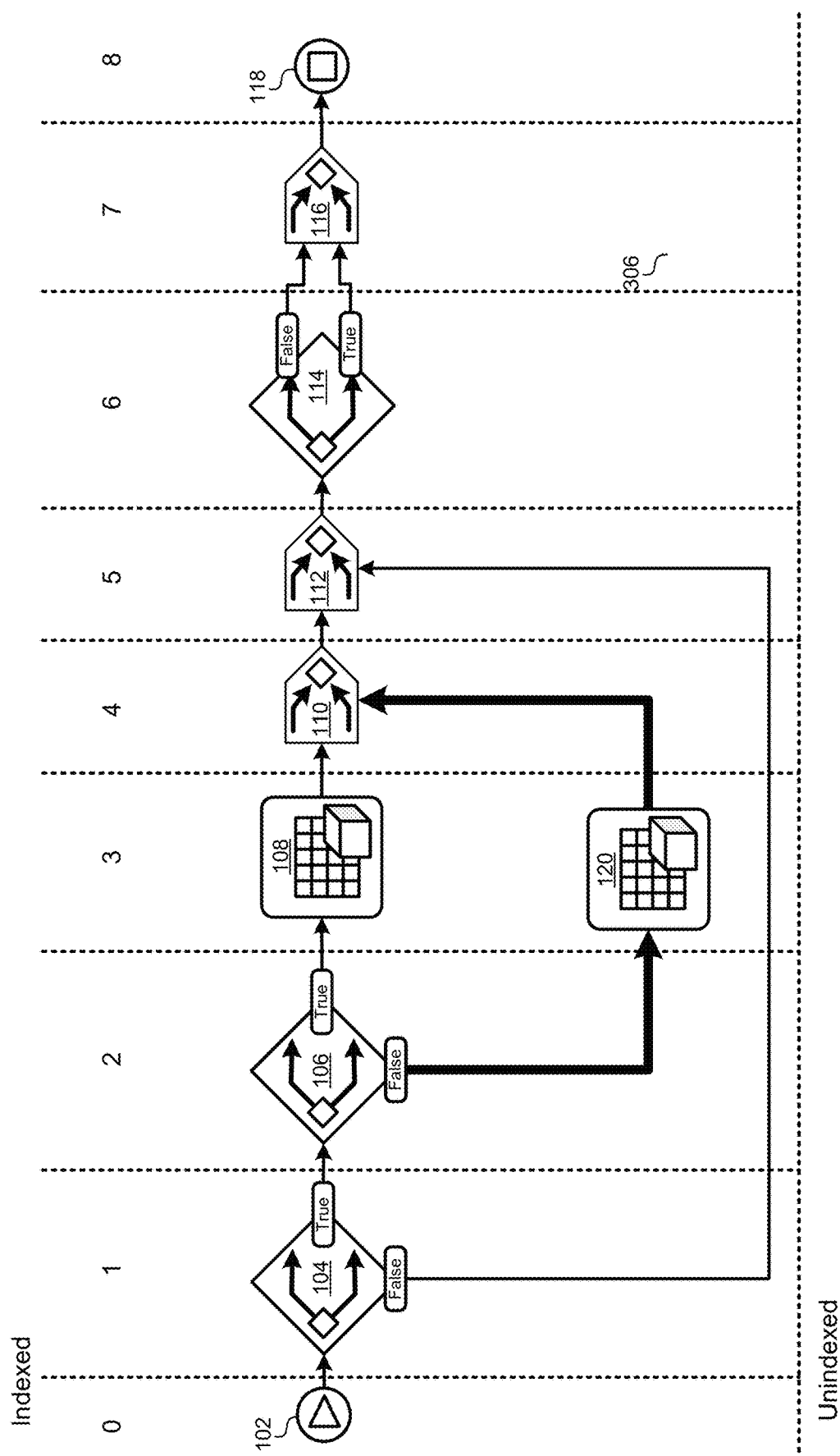

FIG. 3C illustrates how indexes may be assigned to unindexed nodes by traversing each execution pathway, according to some embodiments.

Figure 4A:
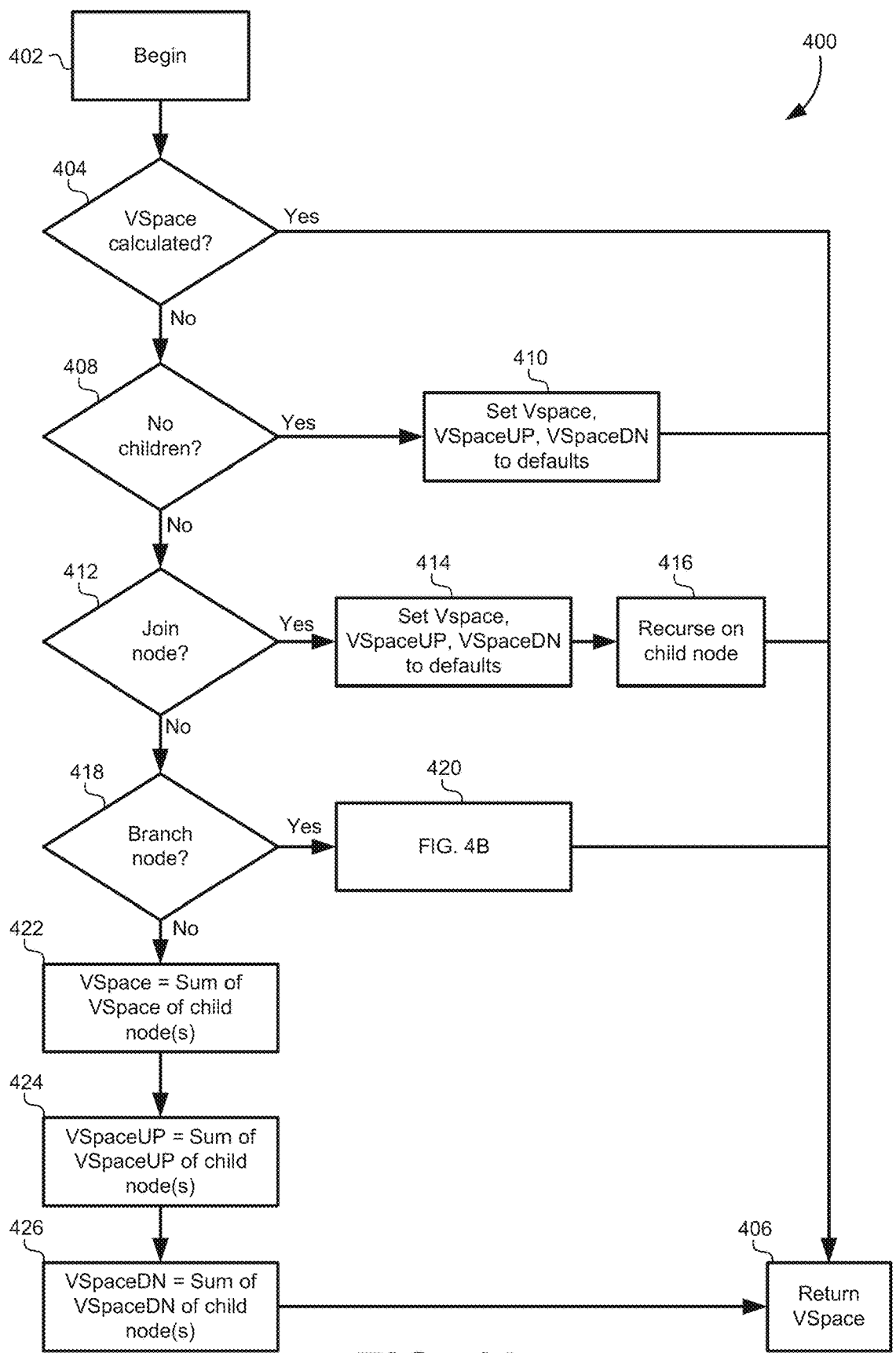

FIG. 4A illustrates a flowchart of a method for determining vertical space requirements for each element, according to some embodiments.

Figure 4B:
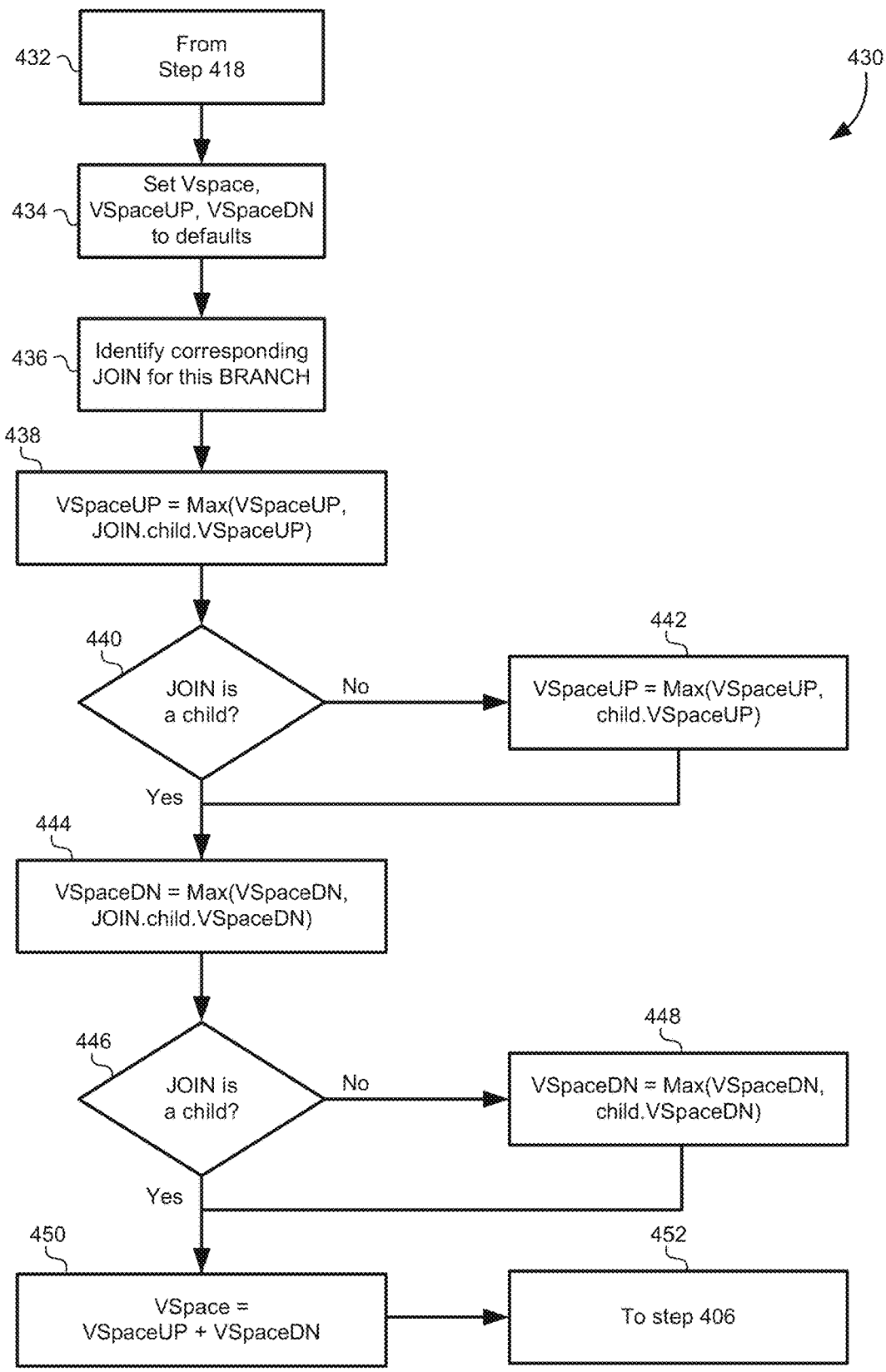

FIG. 4B illustrates a flowchart of a method for determining vertical measurements for a branch node, according to some embodiments.

Figure 5A:
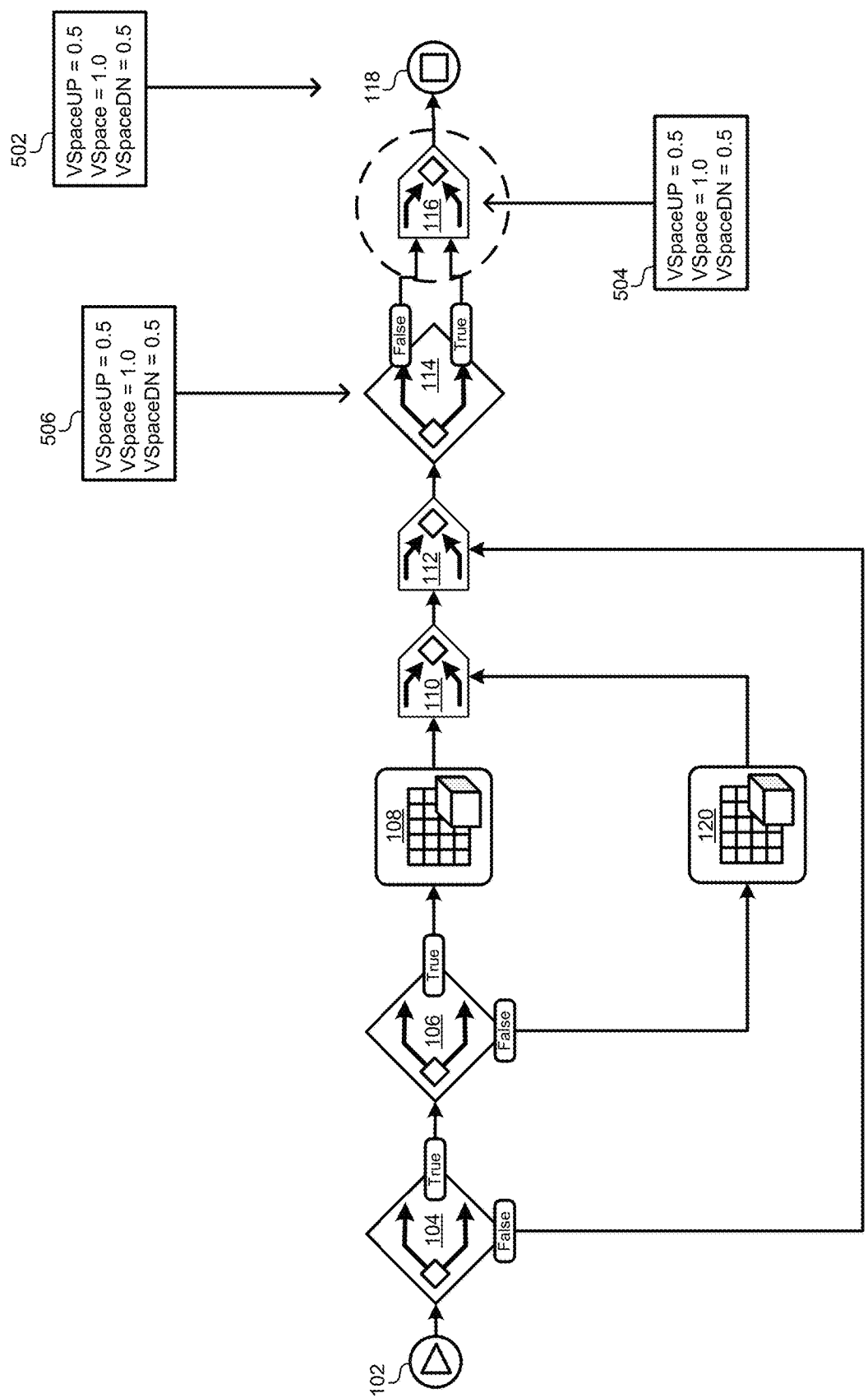

FIG. 5A illustrates an example of how vertical measurements may be calculated for nodes in a flowchart, according to some embodiments.

Figure 5B:
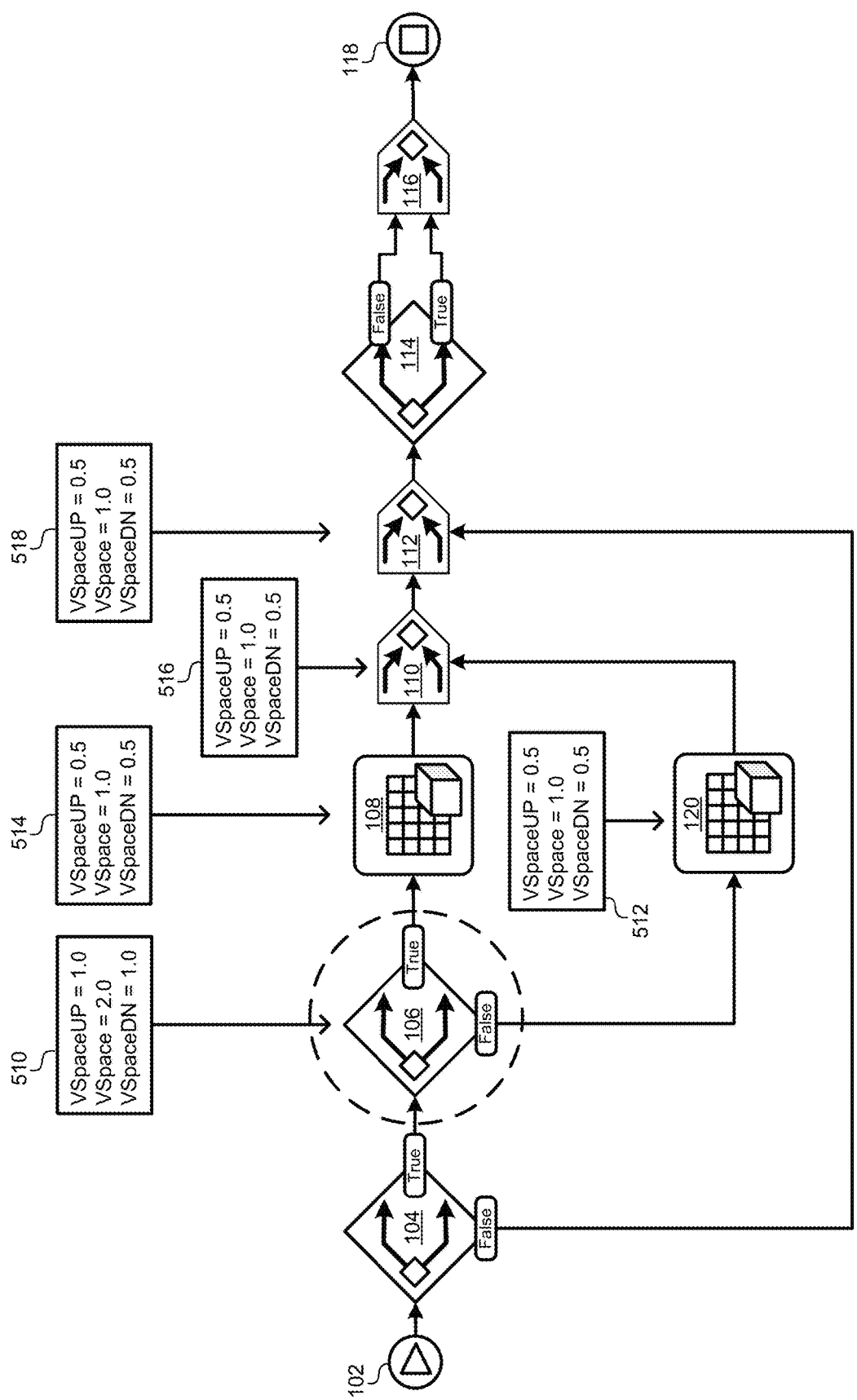

FIG. 5B continues with the example of how vertical measurements may be calculated for nodes in a flowchart, according to some embodiments.

Figure 5C:
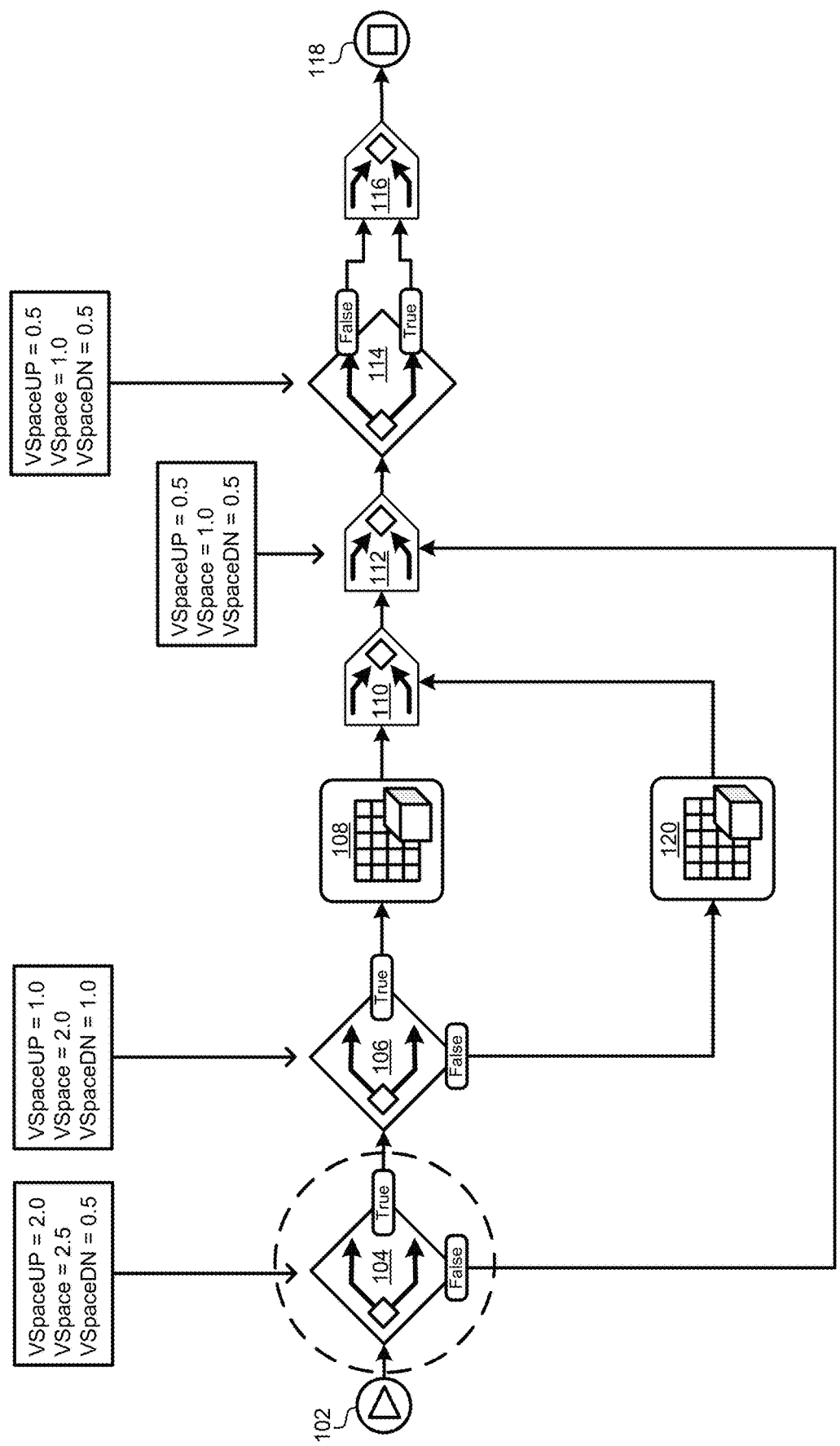

FIG. 5C continues with the example of assigning vertical measurements for branch nodes, according to some embodiments.

Figure 6:
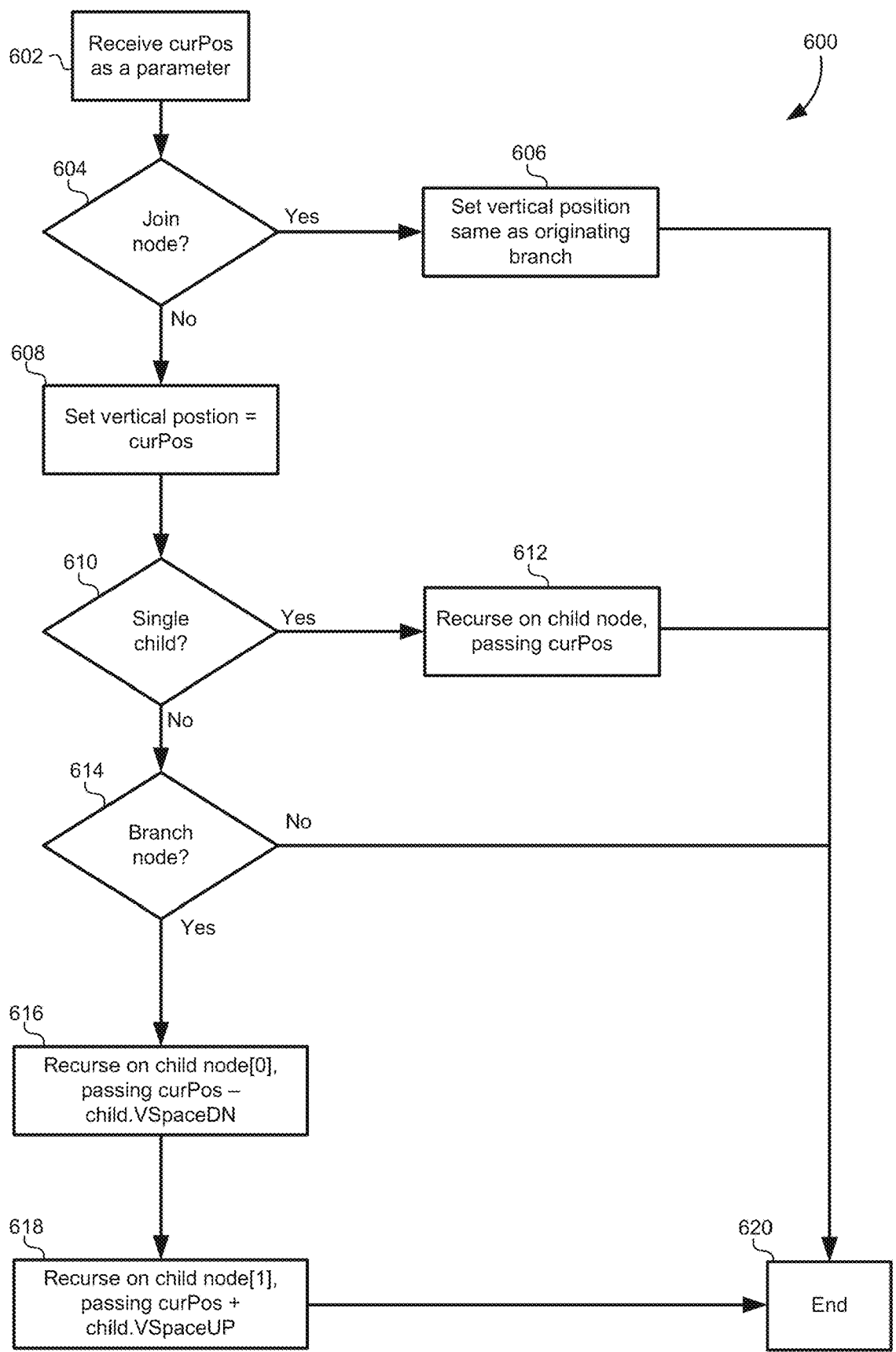

FIG. 6 illustrates a flowchart of a method for assigning vertical positions to nodes, according to some embodiments.

Figure 7A:
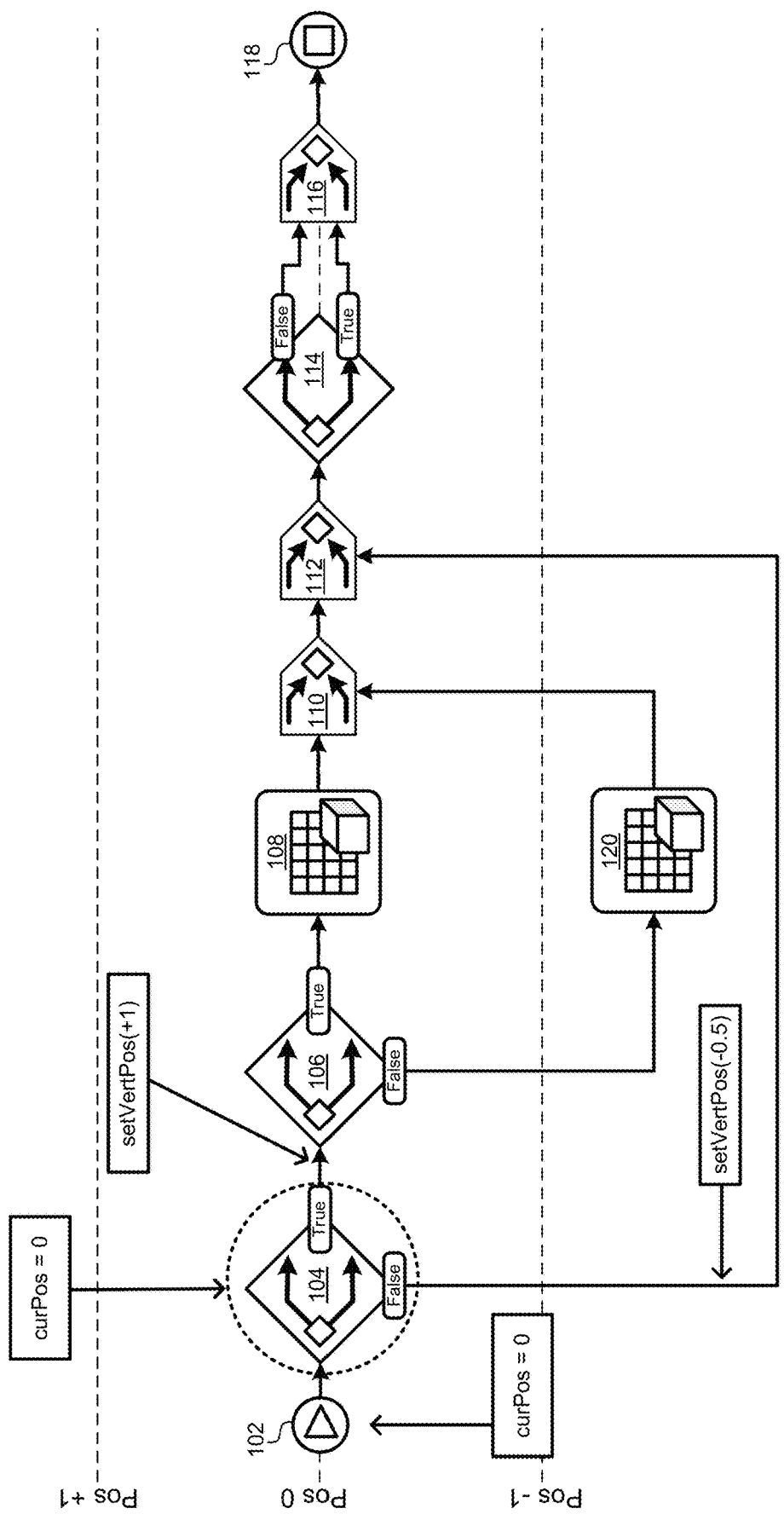

FIG. 7A illustrates how vertical positions may be assigned based on vertical measurements for each node, according to some embodiments.

Figure 7B:
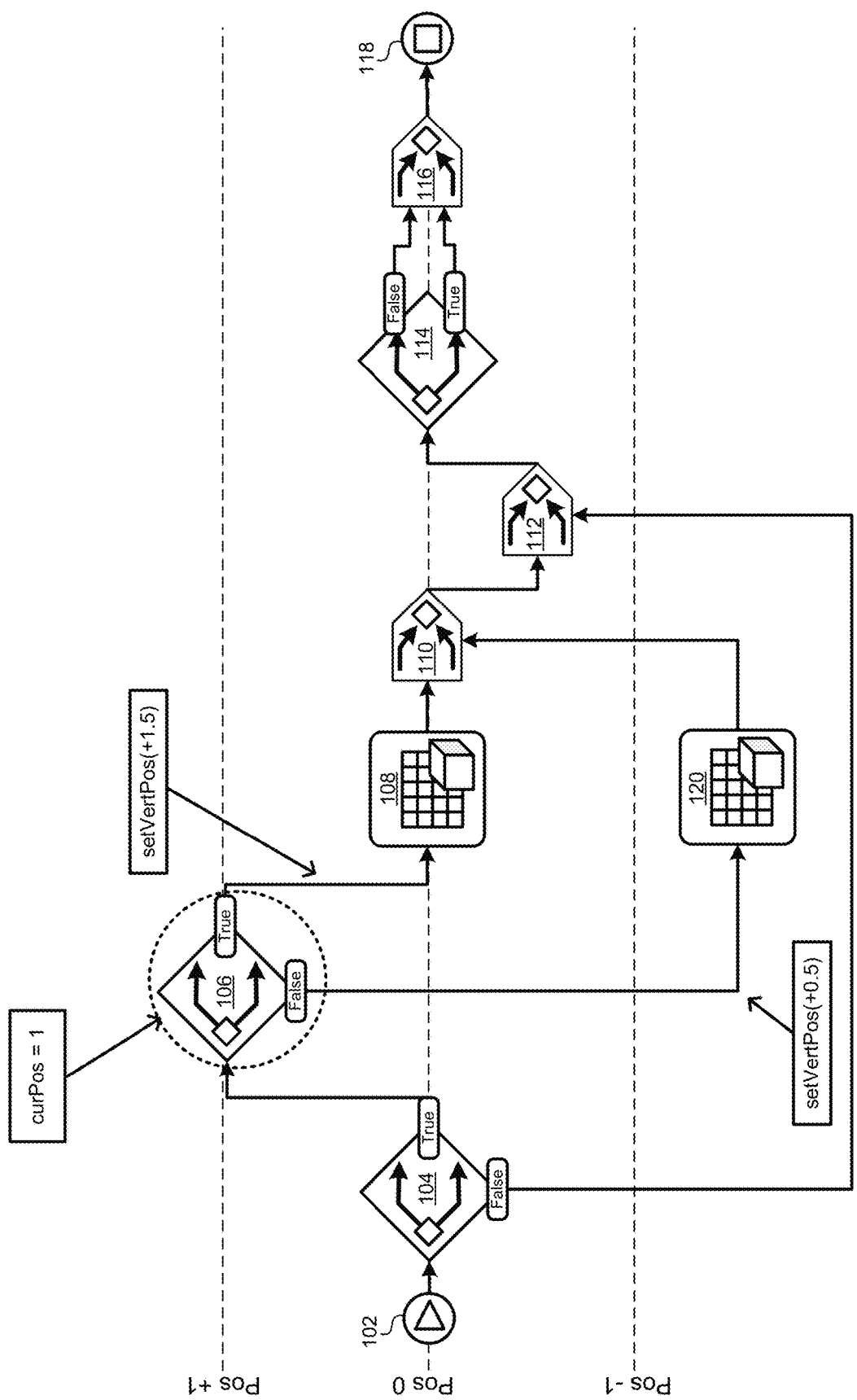

FIG. 7B illustrates how vertical positions may be assigned to child nodes of a branch node, according to some embodiments.

Figure 7C:
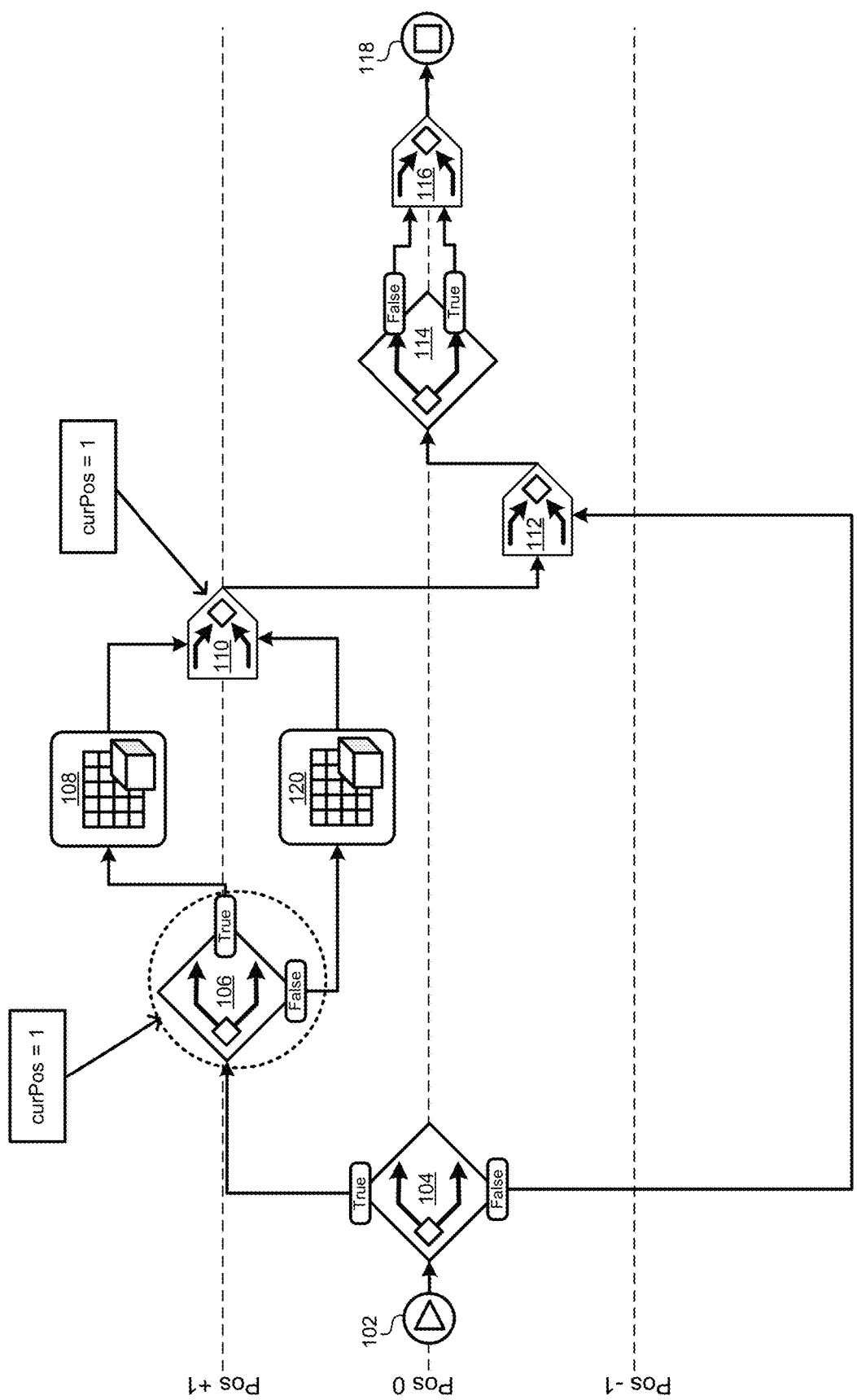

FIG. 7C illustrates how join nodes may be aligned with corresponding branch nodes, according to some embodiments.

Figure 7D:
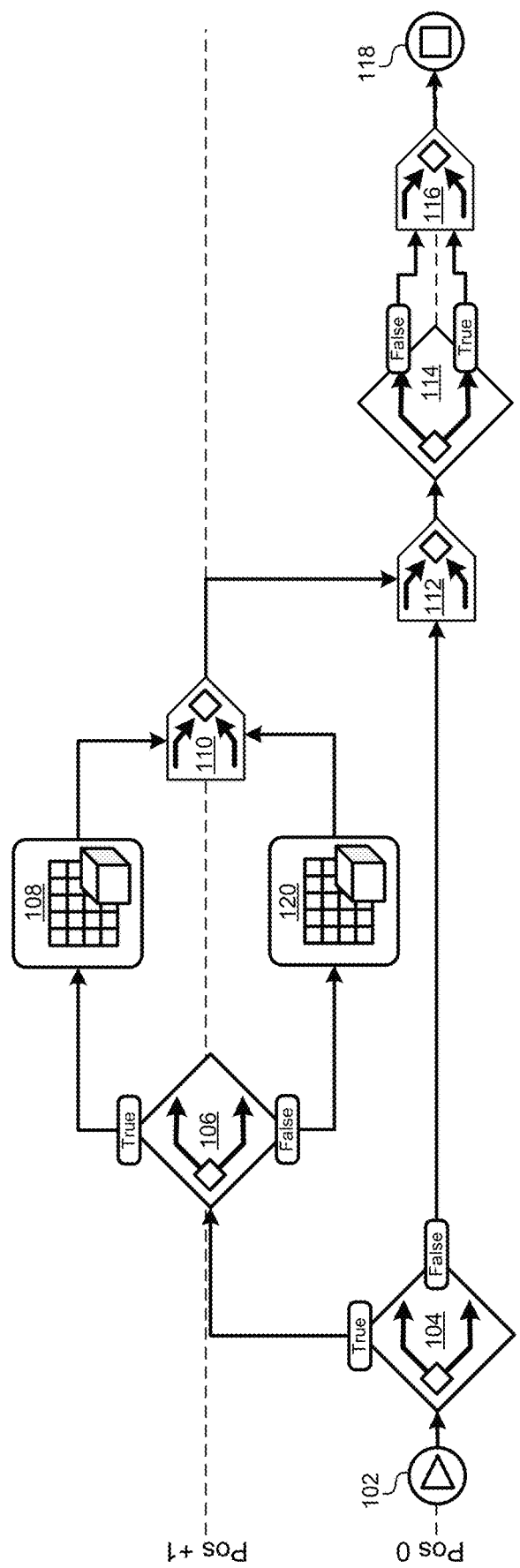

FIG. 7D illustrates a final state for a flowchart after assigning horizontal positions, according to some embodiments.

Figure 8:
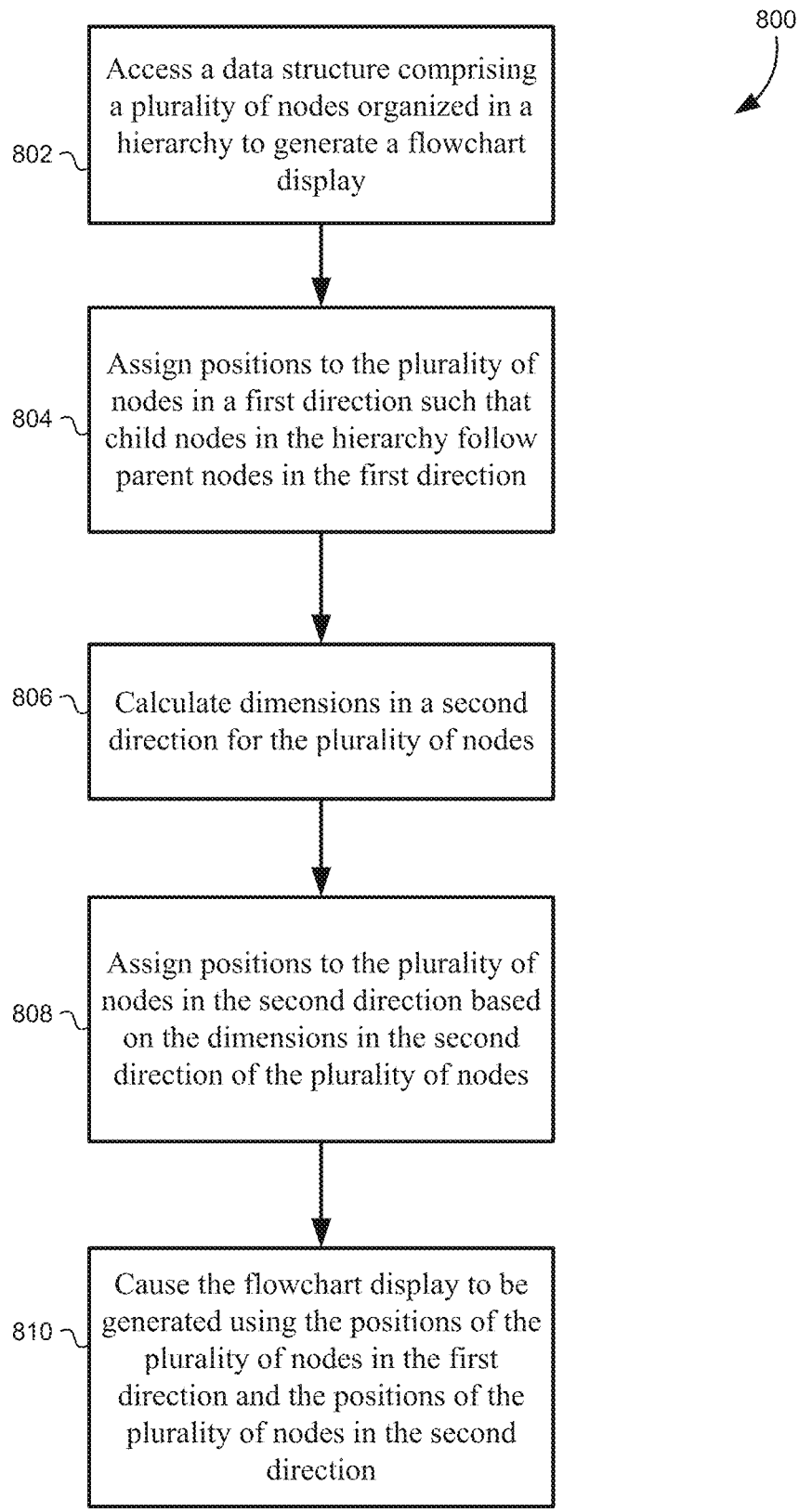

FIG. 8 illustrates a flowchart of a method for generating a layout for a graphical representation of a flowchart, according to some embodiments.

Figure 9:
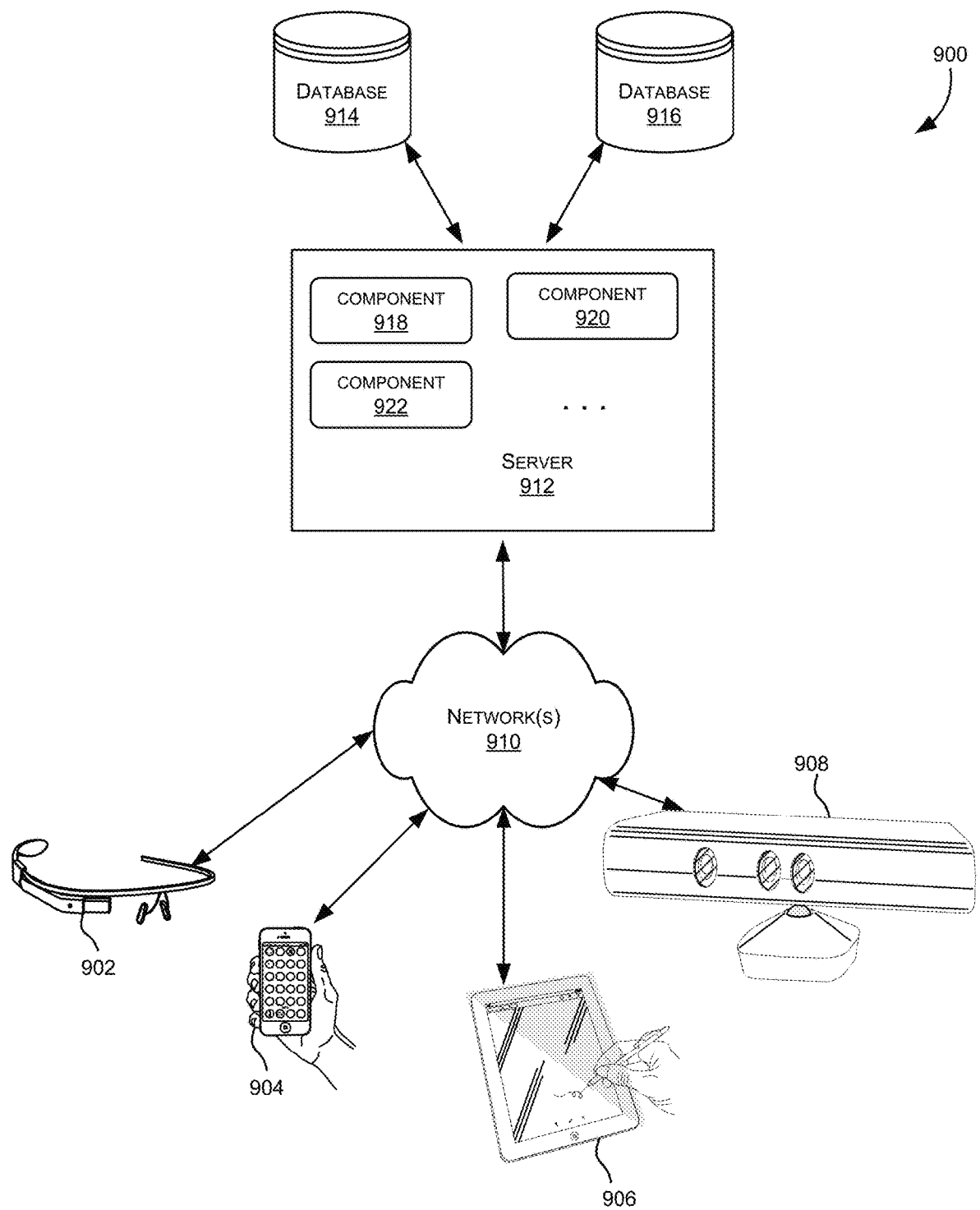

FIG. 9 illustrates a simplified block diagram of a distributed system for implementing some of the embodiments.

Figure 10:
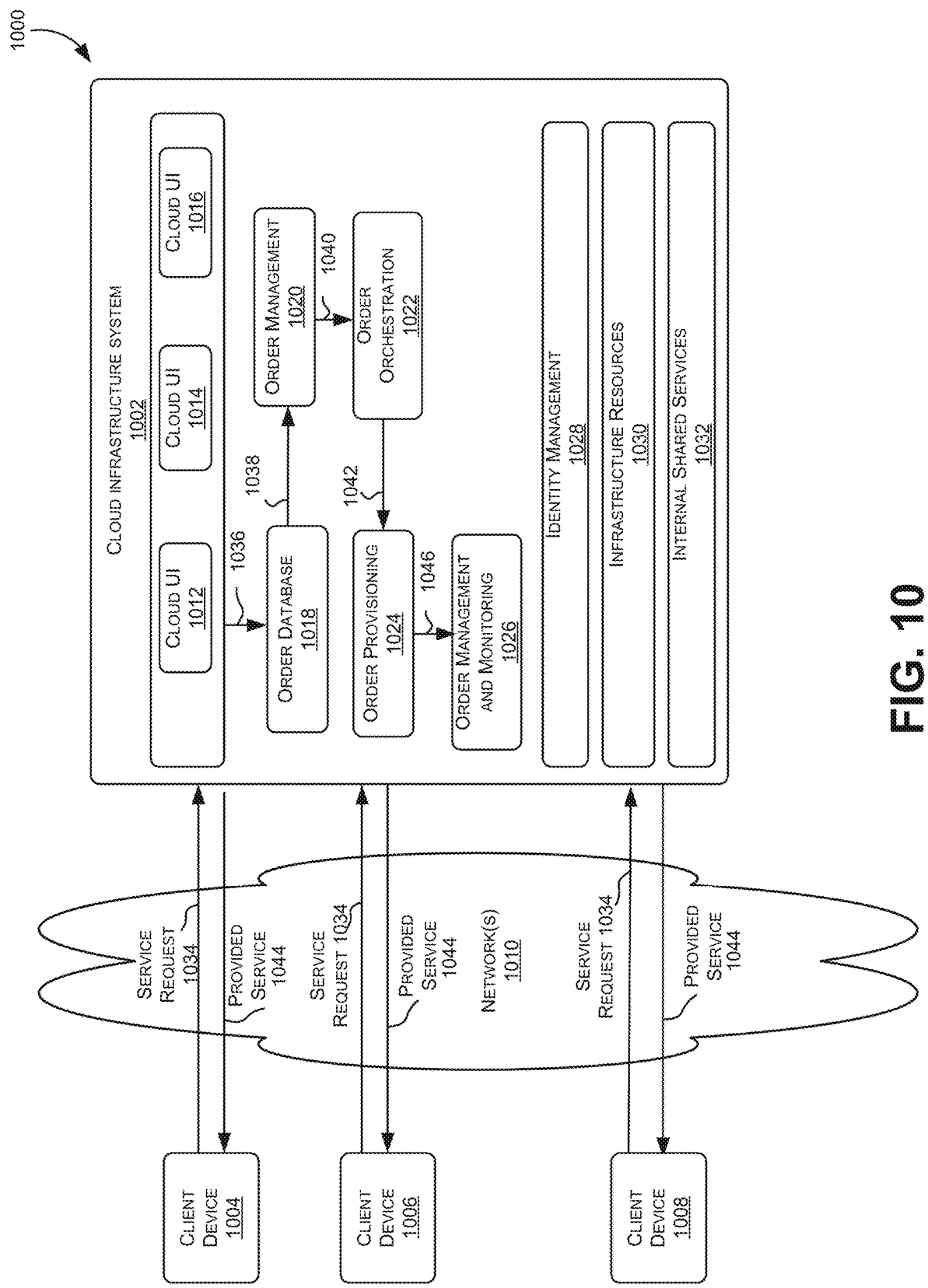

FIG. 10 illustrates a simplified block diagram of components of a system environment by which services provided by the components of an embodiment system may be offered as cloud services.

Figure 11:
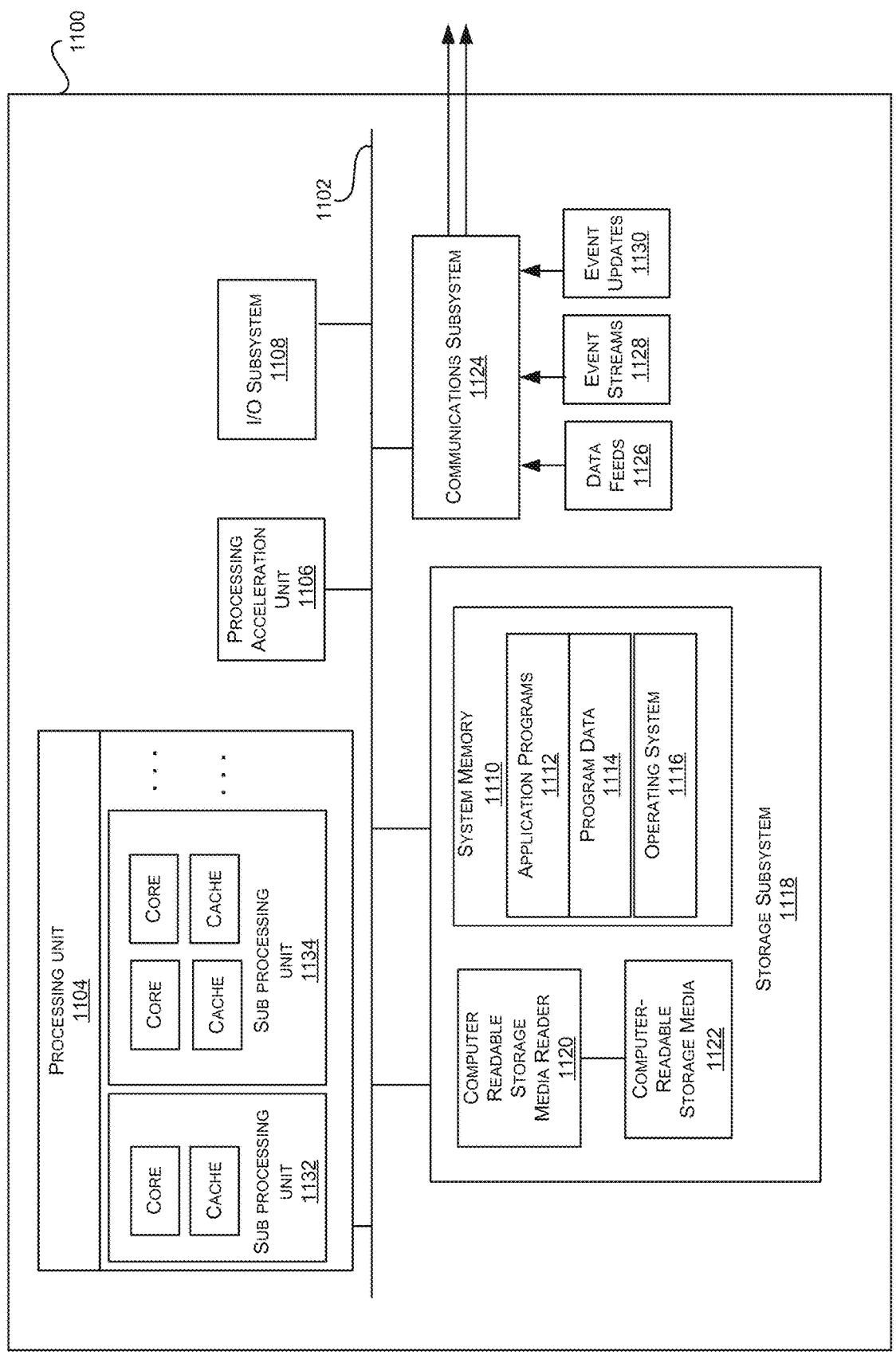

FIG. 11 illustrates an exemplary computer system, in which various embodiments may be implemented.

DETAILED DESCRIPTION

Process flows are a standard construct used across many different applications. A process flow may be represented as a flowchart, which is a decision process comprising a step-by-step set of instructions. For example, a computer program may be represented as a series of steps, including branches, decisions, iterations, loops, and so forth. For example, an orchestration is a set of processes that have been automated together to execute sequentially. Tools are available to graphically lay out process flows such that they can be viewed and/or manipulated through a user interface such that users can follow an execution flow from one process to the next. This type of representation is very useful for illustrating and explaining a process flow to other users, but only insofar as it is organized and readable.

Generally, process flows are laid out by hand by a human user. Occasionally, software tools are used to automate this process, but the resulting layout is usually suboptimal, resulting in awkward spacing, crossed connector paths, and inefficient routing. Human users usually reorganize and rearrange layouts that are automatically generated. For example, Microsoft Visio® is able to render simple diagrams, such as org charts or completely acyclic trees in a rudimentary fashion, but complex processes with decision points, branches, and joins often fail to generate visually acceptable layouts. While the software can handle automatically connecting processes together using lines or arrows, the overall layout always needs to be rearranged and reconfigured by a human user. No satisfactory software tools are available to receive a pure representation of logical element relationships and convert them into a graphical representation or layout that is spaced and arranged in a way that minimizes the space used while simultaneously providing a clear distinction between elements and connections between elements.

The embodiments described herein solve these and other technical layout problems in the field of computer visualization by assigning horizontal locations to each of the elements. This may be done using recursive algorithms that trace along each parent-child pathway to ensure that child elements always occur after parent elements. Vertical spacing requirements may then be calculated for each element, along with a vertical space above a center line and a vertical space below a center line for each element. These vertical spacing requirements may then be used by a recursive algorithm to assign vertical positions to each of the elements. The vertical spacing may ensure that lanes created for each branch element are not crossed by future elements, which ensures that connections between elements are clearly distinguished from each other.

FIG. 1 illustrates an example of a graphical representation 100 of a hierarchy as a flowchart or flow diagram, according to some embodiments. This graphical representation 100 includes at least two types of elements. A first type of element may be referred to as a connection in the graphical representation. Connections may be made using lines or arrows that denote a direction or flow of processing between elements in the graphical representation 100. Although the connections illustrated in FIG. 1 are all represented by solid lines, some embodiments may use dotted lines, dashed lines, and/or different arrow styles to denote different types of connections. Elements may receive one or more connections and may output one or more connections, depending on the type of element. Generally, an arrow connection denotes a direction in which data, decision-making, or execution proceeds through the flowchart. An arrow may indicate a direction of processing, a flow of data (e.g., an output from one node as an input to a subsequent node), a dependency, and/or a hierarchical relationship.

The second type of element may be referred to as a node in the flowchart. This graphical representation 100 includes nodes 102, 104, 106, 108, 110, 112, 114, 116, 118, and 120. Nodes may represent either a start or end location, such as start node 102 or an end node 118. Nodes may also represent a process that is executed on data that is passed to the node. For example, node 108 and node 120 may represent process nodes that receive one or more inputs through connections and provide one or more outputs through connections. Nodes may also represent branches or rules that are executed on input data to determine a route of execution on the output. For example, nodes 104, 106, and 114 may receive an input and generate multiple outputs based on a determination that is made by the node. For example, an expression, value, or state may be evaluated to select between a plurality of different output options. In this example, nodes 104, 106, and 114 may evaluate an expression and include separate outputs for "true" and "false" evaluations of the expression. Nodes may also represent join elements that join two or more execution pathways. For example, nodes 110, 112, and 116 may represent join nodes that receive a plurality of inputs and generate a single output. Join nodes may perform different mathematical or logical functions that combine data that are passed to the join nodes. For example, a join node may aggregate numerical values provided by each of the inputs into a single output value. In another example, a join node may receive two separate branches of execution and proceed with only a single branch of execution afterwards in the flowchart without necessarily performing any functions on the underlying data.

In this example, the execution flow of data and/or decisions through the graphical representation 100 proceeds from left to right in a horizontal direction. Different nodes and execution pathways that occur in parallel may be lined up in a vertical direction. This layout and these directions are provided merely by way of example and are not meant to be limiting. Generally, an execution flow may proceed in a first direction, and parallel execution pathways may be distributed in a second direction, where the first/second directions are orthogonal to each other. The first/second directions may therefore include any directions, including an execution flow that proceeds vertically with parallel execution paths distributed horizontally. The terms "first" and "second" are not meant to imply order, precedence, or any other comparison between the two directions, but are used merely to distinguish one direction from another direction. Visually, although a horizontal direction is used as the direction of execution flow in the examples of this disclosure, this is done only by way of example and is not meant to be limiting. The horizontal direction may be substituted for any other dimension or axis, such as a horizontal direction.

The layout of the graphical representation 100 in this example may have been performed automatically by a software tool, or may have been laid out manually by a human user. However, the horizontal spacing, vertical spacing, and vertical placement of the elements in the graphical representation 100 are not optimal. For example, connection 130 between node 104 and node 112 is covered by node 120. The automatic routing algorithm may have placed node 120 below node 108 in an effort to visually imply parallel processing pathways, but inefficient horizontal spacing caused node 120 to be placed over connection 130. The layout in FIG. 1 may therefore be used as an example as a starting point for generating an optimal layout using the embodiments described below.

FIG. 2 illustrates how an existing flowchart may be translated into a hierarchy of a plurality of nodes, according to some embodiments. In some cases, the starting point for laying out a graphical representation of the flowchart may be receiving a flowchart from any source. As used herein, the term "flowchart" may refer to any representation of a sequence of steps, processes, or operations. A "flowchart" may also include any hierarchical arrangement of data, such as an org chart or tree diagram. For example, a flowchart may include a representation of a business process and/or a file structure for a computer system.

The representation of the flowchart that may be received may come in virtually any form. For example, some flowcharts may be received as a graphical representation. Elements of the flowchart may be laid out in a graphical user interface by a user or generated by an automated process. The representation may be a graphical display of nodes and/or connections that are displayed on a display device. In FIG. 2, a graphical representation of the flowchart 100 described above in FIG. 1 may be drawn by the user in the user interface.

The representation of the flowchart may also include a representation stored in a computer memory. For example, some applications may store flowcharts in XML files, JSON files, databases, spreadsheets, and/or any other data structure. A hierarchical relationship between elements in the flowchart may be defined by relationships in the data, such as relational keys in a database. In some cases, a data structure may be generated from the graphical representation 100 and stored in memory. For example, an XML file 202 may be generated automatically from the graphical representation 100 provided by user. Alternatively, the XML file 202 may be generated in an XML text editor by a user or by another automated process.

The embodiments described herein may receive a flowchart in any of these formats and convert them into a format that is compatible with the algorithms described below. In some cases, the format of the flowchart may be translated into a data structure that stores the logical relationships between elements. A hierarchical data structure 204 may be used that includes an object representing each node in the flowchart, and pointers between objects may be used to represent connections between each node. By way of example, a linked list may be used as a hierarchical data structure 204 by some embodiments. A root may point to or represent a starting node in the linked list, and each node in the linked list may represent a node in the flowchart, such as an employee record, a process, a decision or branch, and/or any other type of node. Each node may also include an array, list, or vector of child elements. Pointers may be stored, for example, in an array pointing to each child node. Some nodes may also include pointers to parent nodes. As used below, child nodes may be referred to using an array notation, such as child[0] referring to a first child node of a current node, node.child[1] referring to a second child node of another node being referenced, and so forth.

The linked list illustrated in FIG. 2 corresponds to the nodes and connections of the graphical representation 100 of the flowchart in FIG. 1. The linked list is used only by way of example and is not meant to be limiting. Any other type of data structure may be used that may be recursively traversed such that each path to a particular node may be traversed using a recursive algorithm. This allows many other types of data structures to be used, so long as operations are available that allow for recursive traversal. Additionally, some embodiments may use a specific type of data structure where multi-parent hierarchies are allowed as well as multi-child relationships. For example, node 106 has two child nodes 108, 110. Node 112 has two parent nodes 108, 110. Multi-child nodes may represent branch/decision nodes, while multi-parent nodes may represent join nodes as described above in FIG. 1. Additionally, some embodiments may allow multiple connections between two nodes. For example, node 116 includes two different connections to node 118. This may represent a branch where both branches lead to the same next step in the process. To simplify references to the underlying data structure, this disclosure may refer to the data structure as a "plurality of nodes," which may be representative of a hierarchy that includes single-child, single-parent, multi-child, and/or multi-parent relationships.

FIG. 3A illustrates how horizontal positions may be assigned to each node, according to some embodiments. A recursive algorithm may be used to assign a horizontal position to each node by traversing the plurality of nodes beginning with a root node 102. Again, the "horizontal" position is used here by way of example, and this algorithm may be used generally for a "first" direction or dimension which need not be horizontal, but which may also include vertical, diagonal, and other directions. The plurality of nodes may include a specific root node 102 that may serve as an entry point to the plurality of nodes. Alternatively, the root node may be inferred by identifying a node without any inbound edges (e.g., parent relationships). As described above, each node in the plurality of nodes may include an array of pointers to child nodes that follow after them. Nodes without any child nodes (e.g., an empty array of pointers) may be a terminal or end node in the flowchart. In general, most nodes may have one child and represent a processing action with a single output. Branch nodes may have two or more children to represent different paths of execution based on a conditional expression. Join nodes may receive multiple connections and output a single connection.

As used herein, the term "plurality of nodes" may refer to the nodes in the data structure, as well as to the positions or icons corresponding to those nodes displayed as part of the flowchart display. When referring to nodes and connections between nodes, the data structure may provide this type of relationship information. However, when referring to sizes, distances, dimensions, or positions of nodes in the graphical display, the plurality of nodes may refer to the dimensions/positions of the associated graphical icons that are displayed on the screen.

A recursive procedure may be used to assign horizontal positions using an index beginning at, for example, 0. These indexed horizontal positions need not be regularly spaced or use a uniform width. Instead, each index may simply refer to a position. For example, in FIG. 3A, each of the indexed positions may be dynamically sized to fit the largest node assigned to that index position. Alternatively, some embodiments may uniformly space and/or size each of the indexed positions in, for example, a static grid pattern.

The recursive algorithm may begin with the root node and may assign it a position index of 0. The algorithm may then be recursively called to descend through each of the children of the root node, assigning each child a position index that is one higher than the current node. For example, in a simple flowchart with no branches or joins, the recursive algorithm would incrementally be called on each successive child node in the flowchart, assigning each successive node an index 1 higher than the previous node (e.g., 0, 1, 2, 3, . . . ).

However, in flowcharts with branches and/or joins, nodes may be processed more than one time as they are reached through different recursive pathways. For example, by recursing through each child node, node 112 may be reached as a child of node 104 and as a child of node 110. Each of these recursions may assign a different index to node 112. If the algorithm reaches a node with an index that has already been assigned, the algorithm may compare the assigned index to the current index. If the previously assigned index is higher, then the algorithm may maintain the higher index, while if the current index is higher than the previously assigned index, then the algorithm may reassign the index to be the current, higher index. This ensures that each node is positioned just far enough to the right to be positioned after all of its ancestor nodes along any execution pathway. If an node has already been reached by a shorter path, then the index may be reassigned to the higher index and the recursive algorithm can reprocess each of the descendants to recursively assign a new, higher index. Pseudocode for this algorithm may include the following.

```
function computeAndSetHPositions(metaNode, curHPos)
{
    if ((! metaNode.hPos) || (metaNode.hPos < curHPos))
    {
        metaNode.hPos = curHPos;
```

-continued

```
        for (var i = 0; i < metaNode.children.length; i++)
        {
            computeAndSetHPositions(metaNode.child[i], curHPos+1);
        }
    }
}
```

Using this algorithm, each path of the execution of the flowchart may be indexed by calling the function and passing a pointer to the root node and a numerical index of 0 as parameters (e.g., computeAndSetHPositions(root, 0)). In the example of FIG. 3A, the recursive algorithm may traverse a first execution path through the plurality of nodes. For example, each child[0] in the child array of each node may be selected first and processed by the recursive function. This may sequentially index each node in the recursive path beginning at 0 and ending at 8 for nodes 102, 104, 106, 108, 110, 112, 114, 116, and 118. Node 120 remains unindexed at this point, while nodes 110, 112 may be reprocessed by the recursive function through other connections as described below.

FIG. 3B illustrates how indexes may be reprocessed through different execution paths using a recursive algorithm, according to some embodiments. Continuing on from FIG. 3A, the second child (e.g., child[1]) of node 104 may be traversed using the recursive algorithm. At this point, it would attempt to assign node 112 to its current index, which would be 2. However, node 112 was previously assigned a higher index of 5. Therefore, the algorithm may allow node 112 to keep its previously assigned index of 5, and need not require node 112 to recursively reprocess each of its children since its index remains unchanged. Note that if this current execution of the recursive process on node 112 had a higher index as its "curHPos" parameter, then that higher index+1 would be passed as a parameter when the function was called to reprocess each of the children of child node 112 recursively.

FIG. 3C illustrates how indexes may be assigned to unindexed nodes by traversing each execution pathway, according to some embodiments. Continuing from FIG. 3B, node 106 may call the recursive function to process its second child (e.g., child[1]). Since node 120 was previously unprocessed, it may be assigned to the index of node 106 incremented by one (e.g., index 3). When the child of node 120 is processed, it would receive an index of 4 as a parameter, which is equal to the existing index of 4. Therefore, since the new index is not greater than the previous index, there is no need to again call the recursive function to process each of the children of node 110.

FIG. 4A illustrates a flowchart 400 of a method for determining vertical space requirements for each element, according to some embodiments. Before assigning a position to each of the nodes, some embodiments may first calculate dimensions of the space that may be used by each of the nodes. These dimensions may be calculated in terms of an index rather than in terms of a raw distance or pixel measurement. For example, a single node it may be referred to as having a vertical space requirement of 1, as it takes a single indexed position before accounting for that of any of its children. After the nodes have all been placed at horizontal/vertical indices, the algorithm may scale these locations to actual pixel/distance measurements for placement on a display screen of a display device.

This algorithm may include a recursive algorithm that is able to make multiple recursive traversals through the plurality of nodes. In some embodiments, the recursive algorithm may determine one or more "distances" or "widths" associated with each node. These distances may include a total vertical space requirement for each node, a distance below a center line for each node, and/or a distance above the center line for each node. Any of these values may then be used to determine a vertical index position for each of the nodes. Again, the vertical direction is used only as an example, and other embodiments may perform this operation in other directions.

The method may begin with a function call that receives a pointer to a node (402). For the current node received as a parameter, a determination can be made as to whether a total vertical space for the node has already been calculated (404). If it has been calculated, then the algorithm may have reached the end of a pathway through the plurality of nodes, and the vertical space may be returned by the function (406).

If the vertical space has not yet been calculated (404), then a determination may be made as to whether the current node has any child nodes (408). If no child nodes are present (e.g., this is a terminal node or end node), then the method may set the distance measurements for the node to a set of default measurements. Using the index-based measurements described above, some embodiments may set a default vertical space distance (VSpace) as 1.0, a distance above the center line (VSpaceUP) as 0.5, and a distance below the center line (VSpaceDN) as 0.5. These measurements are provided only by way of example and are not meant to be limiting. For example, other default measurements need not assume vertical symmetry about a center line and may use different measurements for the distances above/below the center line. After setting the current measurements for the node, the vertical space (VSpace) may be returned by the function (406).

If the current node has one or more child nodes (408), a determination may be made as to whether the current node is a join node (412). As described above, a join node may be a node that receives a plurality of inputs and reduces those inputs to a smaller number of outputs. The simplest example of a join node is a node that receives two inputs and produces a single output. If the current node is a join node, then the vertical measurements may be set to the default values (414) described above (410). Then, the recursive function may be called for each of the child nodes of the join node (416). After returning from processing each of the child nodes, the function may then return the vertical space measurement (406).

If the current node is not a join node (412), then a determination may be made as to whether the current node is a branch node (418). If the current node is a branch node, then a function may be executed that determines the vertical measurements for the branch node based on the vertical space requirements of each of the multiple execution paths that proceed out of the branch node (420). These calculations are described in detail below in FIG. 4B.

If the current node is not a branch node (418), then the VSpace, VSpaceUP, and VSpaceDN values may be set as the sum of these values from each of the child nodes (422, 424, 426). In the simplest case, the current node may be a node with a single input and a single output, and thus the vertical measurements for the current node may equal the vertical measurements for its single child node. At this stage, the vertical space may be returned for the current node (406).

FIG. 4B illustrates a flowchart 430 of a method for determining vertical measurements for a branch node, according to some embodiments. Continuing from step 418 from FIG. 4A (432), the method may first set the vertical measurements to the default values (434) as described above. The method may then determine a corresponding join node for this branch node (436). Each branch node in the plurality of nodes may have a corresponding join node that merges the plurality of pathways generated by the branch node. The join node corresponding to the branch node may be specified when the flowchart is created. Alternatively, the method may traverse the graph through each path created by the branch node to identify the join node where those paths reunite.

After identifying the corresponding join node (436), the algorithm may set the VSpaceUP value to be maximum of the total vertical space (VSpace) of its first child and the VSpaceUP of the child of the corresponding join node. This ensures that a branch node has a vertical distance that takes into account the vertical distances associated with each of the branches that proceed out of the branch node. It also ensures that the branch node has a vertical measurement that is at least as large as the node following its corresponding join node. Calculating the maximum of these values may be calculated through a single step or through multiple steps. For example, FIG. 4B illustrates a multi-step process where the VSpaceUP is first set to the maximum of its current VSpaceUP and the VSpaceUP of the child of the corresponding join node (438). If the join node is not the immediate child of the branch node (440), then the VSpaceUP may be set to the maximum of its current VSpaceUP and the VSpace of the first child of this branch node (442).

After calculating the VSpaceUP value, a similar process may be used to calculate the VSpaceDN value. For example, VSpaceDN may first be set to the maximum of its current VSpaceDN and the VSpaceDN of the child of the corresponding join node (444). If the join node is not the immediate child of the branch node (446), then the VSpaceDN may be set to the maximum of its current VSpaceDN and the VSpace of the first child of this branch node (442). The total VSpace may be calculated as the sum of the VSpaceUP and the VSpaceDN values (450). The function may then return to step 406 of the flowchart in FIG. 4A (552).

Braches having two outputs are used as an example in FIG. 4B. However, this algorithm may be expanded to handle any number of outputs for a branch node. For example, in a five-branch node, the VSpaceUP may be calculated as the larger of two values: (1) the sum of the VSpace of the first child, the VSpace of the second child, and ½ of the VSpace of the third "middle" child; and (2) the VSpaceUP of the child of the corresponding join node. Similarly, the VSpaceDN may be calculated as the larger of two values: (1) the sum of the VSpace of the fifth child, the VSpace of the fourth child, and ½ of the VSpace of the third "middle" child; and (2) the VSpaceDN of the child of the corresponding join node. In each case, the VSpace of the current node may be calculated as the sum of the VSpaceUP and the VSpaceDN.

Pseudocode for the recursive function used for the operations in FIG. 4A and FIG. 4B is illustrated below. This pseudocode is provided merely by way of example and is not meant to be limiting. The specific programming language constructs, order of operations, calculations, and/or design of the pseudocode may be altered in many different ways to achieve the same result of calculating vertical space requirements for nodes in a flowchart.

Function Computeandsetvspacerequirement(metaNode)

```
{
  if (metaNode.vspace)
  {
    // vspace has already been computed.
    return metaNode.vspace;
  }
  if (metaNode.children.length == 0)
  {
    metaNode.vspace = 1
    metaNode.vspaceUp = 0.5;
    metaNode.vspaceDown = 0.5
  }
  if (metaNode.type == 'join') {
    metaNode.vspace = 1;
    metaNode.vspaceUp = 0.5;
    metaNode.vspaceDown = 0.5;
    computeAndSetVSpaceRequirement(metaNode.children[0]);
  }
  else
  {
    metaNode.vspace = 0;
    metaNode.vspaceUp = 0;
    metaNode.vspaceDown = 0;
    for (var i = 0; i < metaNode.children.length; i++)
    {
      metaNode.vspace += computeAndSetVSpaceRequirement(metaNode.children[i]);
      metaNode.vspaceUp += metaNode.children[i].vspaceUp;
      metaNode.vspaceDown += metaNode.children[i].vspaceDown;
    }
    if (metaNode.type == 'rule')
    {
        metaNode.vspace = 1;
        metaNode.vspaceUp = 0.5;
        metaNode.vspaceDown = 0.5
        var join = window.theGraph.metaGraph.nodes['join_' + metaNode.id];
        metaNode.vspaceUp = Math.max(metaNode.vspaceUp, join.children[0].vspaceUp);
        if (metaNode.children[0] != join)
        {
          metaNode.vspaceUp = Math.max(metaNode.vspaceUp,
          metaNode.children[0].vspace);
        }
        metaNode.vspaceDown = Math.max(metaNode.vspaceDown,
        join.children[0].vspaceDown);
        if (metaNode.children[1] != join)
        {
          metaNode.vspaceDown = Math.max(metaNode.vspaceDown,
          metaNode.children[1].vspace);
        }
        metaNode.vspace = metaNode.vspaceUp + metaNode.vspaceDown;
    }
  }
  return metaNode.vspace;
}
```

FIG. 5A illustrates an example of how vertical measurements may be calculated for nodes in a flowchart, according to some embodiments. In the algorithm and pseudocode described above, the function may be recursively called until it is able to assign vertical measurements to one of the nodes. For example, the end node 118 does not have any children, therefore its measurements 502 may be set to the default (e.g., 0.5, 1.0, 0.5). Similarly, node 116 is a join node, and thus its measurements 504 may also be set to the default. Node 114 may set its vertical measurements based on those of its child node 116. This calculation is simplified because the child node 116 is the join node corresponding to the branch node 114. As these functions return their values, the previous nodes that called these functions recursively may calculate their vertical measurements according to the algorithm described above.

FIG. 5B continues with the example of how vertical measurements may be calculated for nodes in a flowchart, according to some embodiments. Nodes 110, 112 are also join nodes, and thus may set their vertical measurements to the default values. Nodes 108, 120 calculate their values 516, 518 by aggregating the vertical measurements of their child nodes. Because nodes 108, 120 are both simple nodes with single children, they can be assigned the default values 512, 514 that were assigned to their children. Node 106 is a branch node with multiple paths of execution extending out of node 106. Therefore, node 106 may use the more complex calculations described in FIG. 4B to determine its vertical measurements. In this case, the maximum vertical space is the total vertical space of each of its child nodes 108, 120. Therefore, the VSpaceUP and VSpaceDN values would be set to 1.0 (i.e., the VSpace of the child nodes), and the VSpace would be set to the sum of these two values, or 2.0.

FIG. 5C continues with the example of assigning vertical measurements for branch nodes, according to some embodiments. Determining the vertical measurements for branch node 104 follows a similar procedure described above in FIG. 5B for branch node 106. The VSpaceUP measurement takes the maximum of the VSpace (e.g., 2.0) for the first child node 106 and the VSpaceUP (e.g., 0.5) for the child node 114 of the corresponding join node 112 to set VSpaceUP to be 2.0. The VSpaceDN measurement uses the VSpaceUP (e.g., 0.5) for the second child node 112, which is also the corresponding join node 112 to set VSpaceUP to 0.5.

FIG. 6 illustrates a flowchart 600 of a method for assigning vertical positions to nodes, according to some embodiments. Now that the vertical space requirements for each node and branch are known, the method can assign vertical positions using those values. Again, this method may use a recursive algorithm that begins at the root node 102 and descends through the tree to determine each position. In some embodiments, this method may use a recursive function that receives a parameter "curPos" indicating a current vertical index (similar to the horizontal index in FIG. 4A). Thus each function call may begin by receiving a "curPos" current position as a parameter (602).

The method may also include determining whether the current node is a join node (604). If the current node is a join node, then the vertical position may be set to be the same index as the originating branch node (606). This ensures that the originating branch node and the corresponding join node line up visually in the vertical direction. The rest of the placement algorithm also ensures that neither of the branches of the corresponding branch node cross the center line of the branch node and/or join node. This prevents connections from overlapping or being covered by other elements as branches become more complex.

If the current node is not a join node (604), then the method may set the vertical position to be curPos as a default value (608). The method may then determine whether the current node has only a single child node (610). If the current node only has a single child node, then the default index of curPos for the vertical position may be maintained and the method may recursively call the function on the child node, passing it the curPos as a parameter (612).

If the current node does not have a single child (610), then a determination can be made if the current node is a branch node (614). If the current node is not a branch node (614), then the node is likely a terminal node, and the curPos vertical position may be maintained, afterwhich the function may exit (620). If the current node is a branch node (614), then the method may recursively call the function on each of the child nodes from the branch node. For a two-node branch, the function may be called for the first child node passing the value of (curPos−child[0].VSpaceUP) as a parameter (616). The function may then be called for the second child node passing the value of (curPos−child[1].VSpaceDN) as a parameter (618). After returning from each of these recursive calls to the child nodes, the function may end and return for the current node (620).

This example uses two child nodes to illustrate how this method may be performed. However, other embodiments may expand this method to handle any number of children in a branch node. This may be accomplished by splitting the vertical space required for the total VSpace of each of the children. For example, using five children, the following values for curPos may be passed to each recursive call:

1st child: vSpaceDN of child[0], VSpace of child[1], and ½ of VSpace for child[2];

2nd child: VSpaceDN of child[1] and ½ of VSpace for child[2];

3rd child: VSpace of child[2], shifted up by VSpaceUP−½ VSpace for child[3];

4th child: ½ of VSpace of child[2] and VSpaceUP of child[3]; and

5th child: ½ of VSpace of child[2], full VSpace of child[3], and VSpaceUP of child[4].

FIG. 7A illustrates how vertical positions may be assigned based on vertical measurements for each node, according to some embodiments. The current position of the root node 102 may be initialized at 0, which may be maintained since it only has a single child node 104. Similarly, a position for branch node 104 may also be assigned 0. Then the function may be recursively called on each child of branch node 104 by adding/subtracting the VSpaceUP/VSpaceDN values for each child node respectively. These parameters may be sent in the function to process node 106 followed by node 112.

FIG. 7B illustrates how vertical positions may be assigned to child nodes of a branch node, according to some embodiments. Beginning with the first child node 106 of branch node 104, the current position may be set to 1, which was passed as a parameter in the recursive function. Branch node 106 may then recursively call the same function on each of the child nodes 108, 120 by adjusting the curPos parameter as described above. Additionally, the second child 112 may be moved to its new position (e.g., −0.5). Note that the order in which the operations are described in FIG. 7B are not necessarily the order in which they would be executed using the recursive function calls. Instead they are provided as an example of how these functions could be executed to evaluate the position of each node for illustrative purposed only.

FIG. 7C illustrates how join nodes may be aligned with corresponding branch nodes, according to some embodiments. When the recursive function reaches join node 110, it may be assigned the position of the corresponding branch node 106. Note that the value passed as a parameter would normally align the join node 110 with its parent node 108. However, the algorithm described above includes a special case for join nodes that ensures they are aligned with corresponding branch nodes.

FIG. 7D illustrates a final state for a flowchart after assigning horizontal positions, according to some embodiments. This example shows the final state of the flowchart used as an example throughout this disclosure. Note that the position of the join node 112 has been aligned with its corresponding branch node 104. Also note that this method creates "lanes" for each branch sets that parallel branches do not cross over into each other.

After this step, vertical positions and horizontal positions have been assigned for all elements. These positions have been assigned using vertical and horizontal indices. Assigning pixel coordinates to each of the nodes may be carried out by multiplying this index by a constant. For example, if each node were 100 pixels×100 pixels, and approximately 60 pixels of buffer space was to be used between each node, the pixel location may be calculated by multiplying the index location by 160.

FIG. 8 illustrates a flowchart 800 of a method for generating a layout for a graphical representation of a flowchart, according to some embodiments. The method may include accessing a data structure comprising a plurality of nodes organized in a hierarchy to generate a flowchart display (802). The data structure may include pointers between child/parent nodes, such as links in a linked list, a database with relational keys, and/or any other data structure that may represent a hierarchy. The hierarchy may include single-parent, multi-parent, multi-child and/or single-child relationships. In some embodiments, the data structure may include an eXtensible Markup Language (XML) file, a JSON file, or any other type of structured text file that stores the hierarchical relationships between the plurality of nodes. The plurality of nodes may include processing nodes that perform operations on data, branch nodes, join nodes, and/or any other type of node. The data structure may be accessed in response to a request to generate a graphic display on a 2D canvas of the plurality of nodes organized in the hierarchy. This may include generating a flowchart or flow diagram that links the plurality of nodes together with connections. The connections may be directional, and may include any of the features described above. Some embodiments may include translating the data structure into a linked list or other data structure that identifies node relationships. For example, a relational database or an XML file may be translated into a linked list.

The method may also include assigning positions to the plurality of nodes in a first direction such that child nodes in the hierarchy follow parent nodes in the first direction (804). The first direction may include a horizontal direction, a vertical direction, a diagonal direction, and/or any other direction used in the display of the hierarchy. For example, the first direction may include the horizontal direction in the figures described above. Assigning positions in the first direction may be accomplished using a recursive algorithm as described above in FIGS. 3A-3B for the horizontal direction. The recursive algorithm may assign an index to a parent node, increment the index, then recursively pass the index to the child nodes. Child nodes may be assigned the index unless the child nodes have already been assigned a larger index in a previous recursive path through the plurality of nodes. The index may indicate a position in the first direction (e.g., 0, 1, 2, etc.), and these positions may be dynamically sized to fit an assigned node having a largest associated icon in the display. These positions may be translated to screen coordinates based on a screen resolution. Nodes in parallel processing paths may be aligned such that they share a same position in the first direction.

The method may additionally include calculating dimensions in a second direction for the plurality of nodes (806). The dimensions in the second direction of parent nodes may be based on dimensions in the second direction of child nodes in the hierarchy as discussed above in relation to FIGS. 4A-5C. This may include recursively calculating dimensions in the second direction for child nodes, then calculating the dimensions in the second direction for the parent nodes as sums or other combinations of the dimensions in the second direction from the child nodes. For example, this step may include calculating distances above/below center lines for each of the nodes. The distance for a branch node may be determined by the dimensions and distances above and below the center lines for the child nodes of the branch node. In the examples above, the second direction may include a vertical direction, and this step may include calculating a vertical space (e.g., VSpace) for each node, as well as vertical distances above/below the center of the node (e.g., VSpaceDN, VSpaceUP). In some embodiments, these measurements may be normalized such that the height of uniform icons may be "1" as used in the examples above. Locations and/or dimensions may be scaled into pixels or other screen coordinates before being displayed and placed on a screen of a display device.

The method may further include assigning positions to the plurality of nodes in the second direction based on the dimensions in the second direction of the plurality of nodes (808). The positions may be assigned using a recursive algorithm as described above in FIG. 6 and FIGS. 7A-7D. This may include identifying a branch node and identifying a corresponding join node in the plurality of node that joins the branches together that are created by the branch node. The branch node and the join node may be assigned a same position in the second direction (e.g., a same vertical position). The recursive algorithm may iterate through each child node. For example, a first child node may receive a current position of the parent node minus a distance in the first direction below a center line of the first child node (e.g., VSpaceDN). Similarly, a second child node may receive a current position of the parent node plus a distance in the first direction above a center line (e.g., VSpaceUP) of the second child node.

The method may also include causing the flowchart display to be generated using the positions of the plurality of nodes in the first direction and the positions of the plurality of nodes in the second direction (810). Connectors may be drawn between the nodes as defined in the data structure. The nodes may be represented as graphical icons as illustrated in the figures described above. The positions may be represented as indices, and the indices may be translated into screen coordinates or other display coordinates. In some embodiments, the display may be divided into a grid, where each grid cell is statically sized or dynamically sized based on the size of the largest icon assigned to that row/column. The indices of the positions may be used to fill the grid with icons.

It should be appreciated that the specific steps illustrated in FIG. 8 provide particular methods of generating a layout of a flowchart according to various embodiments. Other sequences of steps may also be performed according to alternative embodiments. For example, alternative embodiments may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms®), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS®, Windows Phone®, Android®, BlackBerry® 10, Palm® OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux® operating systems, such as for example, Google Chrome® OS. Alternatively, or in addition, client computing devices 902, 904, 906, and 908 may be any other electronic device, such as a thin-client computer, an Internet-enabled gaming system (e.g., a Microsoft Xbox® gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines®), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle®, that are adapted to store, update, and retrieve data in response to SQL-formatted commands.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms®), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the system shown in the figure is only one example of a cloud infrastructure system that may incorporate some embodiments. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud® provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle®) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle®) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service® (JCS), Oracle Database Cloud Service® (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware® services), and Java Cloud® services. In one embodiment, database cloud services may support shared service deployment models that enable organizations to pool database resources and offer customers a Database as a Service in the form of a database cloud. Middleware cloud services may provide a platform for customers to develop and deploy various business applications, and Java® cloud services may provide a platform for customers to deploy Java® applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

FIG. 11 illustrates an exemplary computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux® operating systems, a variety of commercially-available UNIX® or UNIX-like operating systems (including without limitation the variety of GNU/Linux® operating systems, the Google Chrome® OS, and the like) and/or mobile operating systems such as iOS®, Windows® Phone®, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with some embodiments.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media, including storage media and communication media, such as but not limited to, volatile and non-volatile, removable and non-removable media implemented in any method or technology for storage and/or transmission of information. The computer-readable storage media 1122 may also be referred to as a non-transitory computer-readable medium. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:

accessing a data structure comprising a plurality of nodes organized in a hierarchy to generate a flowchart display;

assigning positions to the plurality of nodes, wherein child nodes in the hierarchy follow parent nodes in the first direction;

calculating dimensions in a second direction for the plurality of nodes, wherein each of the dimensions in the second direction represents an amount of space occupied in the second direction by a node and by branching child nodes of the node that follow after the node in the flowchart display;

assigning positions to the plurality of nodes in the second direction based on the dimensions in the second direction of the plurality of nodes, wherein assigning the positions to the plurality of nodes in the second direction comprises:

identifying a branch node in the plurality of nodes;

identifying a join node in the plurality of nodes that joins branches created by the branch node; and assigning a position in the second direction to the branch node and the join node, wherein a line in the first direction between the position of the branch node and the position of the join node does not intersect with any connectors between any of the plurality of nodes; and causing the flowchart display to be generated using the positions of the plurality of nodes in the first direction and the positions of the plurality of nodes in the second direction.

2. The non-transitory computer-readable medium of claim 1, wherein assigning positions to the plurality of nodes in the first direction comprises:

assigning an index to a parent node in the plurality of nodes;

incrementing the index; and recursively passing the index to child nodes of the parent node after the index has been incremented.

3. The non-transitory computer-readable medium of claim 2, wherein assigning positions to the plurality of nodes in the first direction further comprises:

assigning the index to the child nodes unless the child nodes have already been assigned a larger index.

4. The non-transitory computer-readable medium of claim 2, wherein values of the index indicate positions in the first direction, wherein the positions are dynamically sized to fit an assigned node having a largest associated icon.

5. The non-transitory computer-readable medium of claim 1, wherein the plurality of nodes comprises process nodes that receive input data and generate output data.

6. The non-transitory computer-readable medium of claim 1, wherein the plurality of nodes comprises branch nodes that have at least two child nodes.

7. The non-transitory computer-readable medium of claim 1, wherein the plurality of nodes comprises join nodes that have at least two parent nodes and have fewer child nodes than parent nodes.

8. The non-transitory computer-readable medium of claim 1, wherein the data structure comprises an extensible Markup Language (XML) file that describes the plurality of nodes and relationships between the plurality of nodes in the hierarchy.

9. The non-transitory computer-readable medium of claim 1, wherein calculating dimensions in the second direction for the plurality of nodes comprises:

recursively calculating the dimensions in the second direction for child nodes in the hierarchy; and calculating the dimensions in the second direction for parent nodes as sums of the dimensions in the second direction for the child nodes.

10. The non-transitory computer-readable medium of claim 1, wherein calculating dimensions in the second direction for the plurality of nodes comprises:

calculating distances above and below center lines for the plurality of nodes.

11. The non-transitory computer-readable medium of claim 1, wherein calculating dimensions in the second direction for the plurality of nodes further comprises:

recursively calculating distances above and below center lines for child nodes of branch nodes in the hierarchy; and calculating the dimensions in the second direction for the branch nodes based on the distances above and below the center lines for the child nodes.

12. The non-transitory computer-readable medium of claim 1, wherein assigning the positions to the plurality of nodes in the second direction comprises:

assigning a position in the second direction to a current node; and recursively assigning positions in the second direction to child nodes of the current node based on the position of the current node.

13. The non-transitory computer-readable medium of claim 12, wherein recursively assigning the positions in the second direction to the child nodes of the current node comprises:

passing a first child node the position of the current node minus a distance in the first direction occupied by the first child node below a center line of the first child node; and passing a second child node the position of the current node plus a distance in the first direction occupied by the second child node above a center line of the second child node.

14. The non-transitory computer-readable medium of claim 1, wherein parallel execution paths in the hierarchy occupy a same position in the first direction.

15. The non-transitory computer-readable medium of claim 1, wherein the operations further comprise translating the data structure comprising the plurality of nodes into a linked list.

16. A method of generating a layout for a flowchart, the method comprising:

accessing a data structure comprising a plurality of nodes organized in a hierarchy to generate a flowchart display;

assigning positions to the plurality of nodes, wherein child nodes in the hierarchy follow parent nodes in the first direction;

calculating dimensions in a second direction for the plurality of nodes, wherein each of the dimensions in the second direction represents an amount of space occupied in the second direction by a node and by branching child nodes of the node that follow after the node in the flowchart display;

assigning positions to the plurality of nodes in the second direction based on the dimensions in the second direction of the plurality of nodes, wherein assigning the positions to the plurality of nodes in the second direction comprises:

identifying a branch node in the plurality of nodes;

identifying a join node in the plurality of nodes that joins branches created by the branch node; and assigning a position in the second direction to the branch node and the join node, wherein a line in the first direction between the position of the branch node and the position of the join node does not intersect with any connectors between any of the plurality of nodes; and causing the flowchart display to be generated using the positions of the plurality of nodes in the first direction and the positions of the plurality of nodes in the second direction.

17. A system comprising:
one or more processors; and
one or more memory devices comprising instructions that, when executed by the one or more processors, cause the one or more processors to perform operations comprising:
  accessing a data structure comprising a plurality of nodes organized in a hierarchy to generate a flowchart display;
  assigning positions to the plurality of nodes, wherein child nodes in the hierarchy follow parent nodes in the first direction;
  calculating dimensions in a second direction for the plurality of nodes, wherein each of the dimensions in the second direction represents an amount of space occupied in the second direction by a node and by branching child nodes of the node that follow after the node in the flowchart display;
  assigning positions to the plurality of nodes in the second direction based on the dimensions in the second direction of the plurality of nodes, wherein assigning the positions to the plurality of nodes in the second direction comprises:
    identifying a branch node in the plurality of nodes;
    identifying a join node in the plurality of nodes that joins branches created by the branch node; and
    assigning a position in the second direction to the branch node and the join node, wherein a line in the first direction between the position of the branch node and the position of the join node does not intersect with any connectors between any of the plurality of nodes; and
  causing the flowchart display to be generated using the positions of the plurality of nodes in the first direction and the positions of the plurality of nodes in the second direction.

* * * * *

UNITED STATES PATENT AND TRADEMARK OFFICE
CERTIFICATE OF CORRECTION

| | | |
|---|---|---|
| PATENT NO. | : 12,197,843 B2 | Page 1 of 1 |
| APPLICATION NO. | : 17/216010 | |
| DATED | : January 14, 2025 | |
| INVENTOR(S) | : Rodgers | |

It is certified that error appears in the above-identified patent and that said Letters Patent is hereby corrected as shown below:

In the Drawings

On sheet 11 of 19, Fig. 6, under Reference Numeral 608, Line 1, delete "postion" and insert -- position --.

In the Specification

In Column 10, Line 44, delete "Braches" and insert -- Branches --, therefor.

In Column 13, Line 44, delete "afterwhich" and insert -- after which --, therefor.

In Column 17, Line 54, delete "Linux" and insert -- Linux® --, therefor.

In Column 21, Line 28, delete "Cloud®" and insert -- cloud® --, therefor.

In Column 25, Line 36, delete "Windows®" and insert -- Windows --, therefor.

In the Claims

In Column 29, Line 48, in Claim 8, delete "extensible" and insert -- eXtensible --, therefor.

Signed and Sealed this
Eighth Day of April, 2025

Coke Morgan Stewart
*Acting Director of the United States Patent and Trademark Office*